United States Patent
Jeong et al.

(10) Patent No.: US 7,316,248 B2
(45) Date of Patent: Jan. 8, 2008

(54) APPARATUS AND METHOD OF DISPENSING LIQUID CRYSTAL

(75) Inventors: Jae-Gyu Jeong, Daegu (KR); Sang-Hyun Kim, Gyeongsangbuk-Do (KR); Soo-Min Kwak, Gyeongsangbuk-Do (KR); Yong-Keun Kwak, Gangwon-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 167 days.

(21) Appl. No.: 10/988,834

(22) Filed: Nov. 16, 2004

(65) Prior Publication Data
US 2005/0126475 A1    Jun. 16, 2005

(30) Foreign Application Priority Data
Nov. 17, 2003   (KR) .................. 10-2003-0081166
Nov. 28, 2003   (KR) .................. 10-2003-0085739

(51) Int. Cl.
*B65B 1/04*   (2006.01)

(52) U.S. Cl. .................. 141/67; 141/86; 141/286; 349/187; 239/590; 239/575

(58) Field of Classification Search .................. 141/67, 141/4, 7, 98, 86–89, 286; 349/187–189; 222/390; 239/590, 575
See application file for complete search history.

(56) References Cited

U.S. PATENT DOCUMENTS

| | | | |
|---|---|---|---|
| 3,415,294 A * | 12/1968 | Kelly .................. 141/1 |
| 3,978,580 A | 9/1976 | Leupp et al. |
| 4,094,058 A | 6/1978 | Yasutake et al. |
| 4,653,864 A | 3/1987 | Baron |
| 4,775,225 A | 10/1988 | Tsuboyama |
| 4,811,905 A * | 3/1989 | Ishikawa et al. ............ 239/575 |
| 4,691,995 A | 9/1989 | Yamazaki |
| 5,247,377 A | 9/1993 | Omeis |
| 5,263,888 A | 11/1993 | Ishihara |
| 5,379,139 A | 1/1995 | Sato |
| 5,406,989 A | 4/1995 | Abe |
| 5,499,128 A | 3/1996 | Hasegawa |
| 5,507,323 A | 4/1996 | Abe |
| 5,511,591 A | 4/1996 | Abe |
| 5,539,545 A | 7/1996 | Shimizu |
| 5,548,429 A | 8/1996 | Tsujita |
| 5,642,214 A | 6/1997 | Ishii |
| 5,680,189 A | 10/1997 | Shimizu |
| 5,742,370 A | 4/1998 | Kim |

(Continued)

FOREIGN PATENT DOCUMENTS

CN    1439920    9/2003

(Continued)

*Primary Examiner*—Steven O. Douglas
(74) *Attorney, Agent, or Firm*—McKenna Long & Aldridge LLP

(57) ABSTRACT

A liquid crystal dispensing apparatus includes a container containing liquid crystal material; a discharge pump drawing in and discharging the liquid crystal material; a nozzle dispensing, onto a substrate, liquid crystal material discharged by the discharge pump; and a detector arranged near the nozzle to detect the presence of residual liquid crystal material accumulated on the surface of the nozzle. When the presence of residual liquid crystal material is detected, a dummy dispensing operation and/or a cleaning operation may be performed to remove the residual liquid crystal material.

76 Claims, 14 Drawing Sheets

U.S. PATENT DOCUMENTS

| | | | |
|---|---|---|---|
| 5,757,451 A | 5/1998 | Miyazaki | |
| 5,852,484 A | 12/1998 | Inoue | |
| 5,854,664 A | 12/1998 | Inoue | |
| 5,861,932 A | 1/1999 | Inata | |
| 5,875,922 A | 3/1999 | Chastine | |
| 5,952,676 A | 9/1999 | Sato | |
| 5,956,112 A | 9/1999 | Fujimori | |
| 6,001,203 A | 12/1999 | Yamada | |
| 6,011,609 A | 1/2000 | Kato | |
| 6,016,178 A | 1/2000 | Kataoka | |
| 6,016,181 A | 1/2000 | Shimada | |
| 6,055,035 A | 4/2000 | von Gutfeld | |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 | 10/2001 | Egami | |
| 6,337,730 B1 | 1/2002 | Ozaki | |
| 6,414,733 B1 | 7/2002 | Ishikawa | |
| 6,805,308 B2 * | 10/2004 | Kweon et al. | 239/583 |
| 6,997,216 B2 * | 2/2006 | Ryu et al. | 141/67 |

FOREIGN PATENT DOCUMENTS

| | | |
|---|---|---|
| EP | 1 003 066 A1 | 5/2000 |
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |

| | | | | | | |
|---|---|---|---|---|---|---|
| JP | 2001-166272 | 6/2001 | | JP | 2002-139734 | 5/2002 |
| JP | 2001-166310 | 6/2001 | | JP | 2002-156518 | 5/2002 |
| JP | 2001-183683 | 7/2001 | | JP | 2002-169166 | 6/2002 |
| JP | 2001-201750 | 7/2001 | | JP | 2002-169167 | 6/2002 |
| JP | 2001-209052 | 8/2001 | | JP | 2002-182222 | 6/2002 |
| JP | 2001-209056 | 8/2001 | | JP | 2002-202512 | 7/2002 |
| JP | 2001-209057 | 8/2001 | | JP | 2002-202514 | 7/2002 |
| JP | 2001-209058 | 8/2001 | | JP | 2002-214626 | 7/2002 |
| JP | 2001-209060 | 8/2001 | | JP | 2002-229042 | 8/2002 |
| JP | 2001-215459 | 8/2001 | | JP | 2002-236276 | 8/2002 |
| JP | 2001-222017 | 8/2001 | | JP | 2002-258299 | 8/2002 |
| JP | 2001-235758 | 8/2001 | | JP | 2002-236292 | 9/2002 |
| JP | 2001-255542 | 9/2001 | | JP | 2002-277865 | 9/2002 |
| JP | 2001-264782 | 9/2001 | | JP | 2002-277866 | 9/2002 |
| JP | 2001-272640 | 10/2001 | | JP | 2002-277881 | 9/2002 |
| JP | 2001-281675 | 10/2001 | | JP | 2002-287156 | 10/2002 |
| JP | 2001-281678 | 10/2001 | | JP | 2002-296605 | 10/2002 |
| JP | 2001-282126 | 10/2001 | | JP | 2002-311438 | 10/2002 |
| JP | 2001-305563 | 10/2001 | | JP | 2002-311440 | 10/2002 |
| JP | 2001-330837 | 11/2001 | | JP | 2002-311442 | 10/2002 |
| JP | 2001-330840 | 11/2001 | | JP | 2002-323687 | 11/2002 |
| JP | 2001-356353 | 12/2001 | | JP | 2002-323694 | 11/2002 |
| JP | 2001-356354 | 12/2001 | | JP | 2002-333628 | 11/2002 |
| JP | 2002-014360 | 1/2002 | | JP | 2002-333635 | 11/2002 |
| JP | 2002-023176 | 1/2002 | | JP | 2002-333843 | 11/2002 |
| JP | 2002-049045 | 2/2002 | | JP | 2002-341329 | 11/2002 |
| JP | 2002-079160 | 3/2002 | | JP | 2002-341355 | 11/2002 |
| JP | 2002-080321 | 3/2002 | | JP | 2002-341356 | 11/2002 |
| JP | 2002-082340 | 3/2002 | | JP | 2002-341357 | 11/2002 |
| JP | 2002-090759 | 3/2002 | | JP | 2002-341358 | 11/2002 |
| JP | 2002-090760 | 3/2002 | | JP | 2002-341362 | 11/2002 |
| JP | 2002-107740 | 4/2002 | | JP | 2002341359 | 11/2002 |
| JP | 2002-122870 | 4/2002 | | KR | 2000-0035302 | 6/2000 |
| JP | 2002-122872 | 4/2002 | | | | |
| JP | 2002-122873 | 4/2002 | | | | |
| JP | 2002-131762 | 5/2002 | | | | |

\* cited by examiner

APPARATUS AND METHOD OF DISPENSING LIQUID CRYSTAL

This application claims the benefit of Korean Patent Application No. 81166/2003, filed on Nov. 17, 2003, and Korean Patent Application No. 85739/2003, filed on Nov. 28, 2003, each of which are hereby incorporated by reference for all purposes as if fully set forth herein.

BACKGROUND OF THE INVENTION

1. Field of the Invention

The present invention relates to a liquid crystal dispensing apparatus. More particularly, the present invention relates to a liquid crystal dispensing apparatus capable of dispensing precise amounts of liquid crystal material.

2. Discussion of the Related Art

As various portable electric devices such as mobile phones, personal digital assistant (PDA), note book computers, etc., continue to be developed, various types of flat panel display devices such as liquid crystal displays (LCDs), plasma display panels (PDPs), field emission displays (FEDs), and vacuum fluorescent displays (VFDs), having a compact construction, light weight, and low power-consumption characteristics also continue to be developed. Owing to the ease with which they are driven, and to their superior ability to display images, LCDs are extensively used.

FIG. 1 illustrates a cross sectional view of a related art LCD device.

Referring to FIG. 1, a related art LCD device 1 generally comprises a lower substrate 5, an upper substrate 3, and a liquid crystal layer 7 formed therebetween. The lower substrate 5 (i.e., a driving device array substrate) includes a plurality of pixels (not shown), and a driving device (e.g., a thin film transistor (TFT)) and pixel electrode formed at each pixel. The upper substrate 3 (i.e., a color filter substrate) includes a color filter layer for realizing color and a common electrode. An alignment layer is formed on both the lower and upper substrates 5 and 3 to align liquid crystal molecules of the liquid crystal layer 7. The lower substrate 5 and the upper substrate 3 are attached to each other by a sealant material 9, formed at peripheral regions thereof. Accordingly, the liquid crystal 7 is confined within an area defined by the peripheral regions.

Light transmittance characteristics of the pixels are controlled by causing the driving devices to generate electric fields between the pixel electrodes and the common electrode. The generated electric fields reorient liquid crystal molecules of the liquid crystal layer 7 to display a picture.

FIG. 2 illustrates a flow chart of a related art method for fabricating the LCD device shown in FIG. 1.

Referring to FIG. 2, the related art method of fabricating the LCD device described above generally consists of three sub-processes: a TFT array substrate forming process; a color filter substrate forming process; and a cell forming process.

At step S101, a TFT array substrate forming process is performed whereby a plurality of gate lines and data lines are formed on the lower substrate 5 (e.g., a glass substrate) to define an array of pixel areas. TFTs are connected to the gate and the data lines within each pixel area and pixel electrodes are connected to the thin film transistors to drive a subsequently provided liquid crystal layer in accordance with a signal applied through the thin film transistor.

At step S104, a color filter process is performed whereby R, G, and B color filter layers, for realizing predetermined colors, and a common electrode are formed on the upper substrate 3 (i.e., a glass substrate).

At steps S102 and S105, alignment layers are formed over the entire surface of both the lower substrate 5 and upper substrate 3. Subsequently, the alignment layers are rubbed to induce predetermined surface anchoring characteristics (i.e., a pretilt angle and alignment direction) within the liquid crystal molecules of the liquid crystal layer 7.

At step S103, spacers are dispersed onto the lower substrate 5. At step S106, sealant material is printed at peripheral regions of the upper substrate 3. At step S107, the lower and upper substrates 5 and 3 are pressed and bonded together (i.e., assembled) and the spacers dispersed at step S103 ensure that a cell gap formed between the assembled lower and upper substrates 5 and 3 is uniform.

At step S108, the assembled upper and lower substrates 5 and 3 are cut into unit panels. Specifically, the lower substrate 5 and the upper substrate 3 each include a plurality of unit panel areas, within each of which individual TFT arrays and color filters are formed.

At step S109, liquid crystal material is injected into the cell gap of each of the unit panels through a liquid crystal injection hole defined within the sealant material. After each cell gap is completely filled with liquid crystal material, the liquid crystal injection hole is sealed. At step S110, the filled and sealed unit panels are then tested.

FIG. 3 illustrates a related art liquid crystal injection system for fabricating the related art LCD device.

Referring to FIG. 3, a container 12, containing a supply of liquid crystal material 14, is placed into a vacuum chamber 10 that is connected to a vacuum pump (not shown). Subsequently, a unit panel 1, formed as described above with respect to FIG. 2, is arranged over the container 12 using a unit panel handling device (not shown). Next, the vacuum pump is operated to reduce the pressure within the vacuum chamber 10 to a predetermined vacuum state. The unit panel handling device then lowers the unit panel 1 such that the liquid crystal injection hole 16 contacts a surface of the supply of liquid crystal material 14. After contact is established, liquid crystal material 14 contained within the container 12 can be drawn through the liquid crystal injection hole 16 and into the cell gap of the unit panel 1 due to a capillary effect. The injection method described above, therefore, is generally known as a dipping injection method.

After contact is established, the rate at which the liquid crystal material 14 is drawn into to the cell gap of the unit panel 1 can be increased by pumping nitrogen gas ($N_2$) into the vacuum chamber 10, thereby increasing the pressure within the vacuum chamber 10. As the pressure within the vacuum chamber 10 increases, a pressure differential is created between within the cell gap of the unit panel 1 and the interior of the vacuum chamber 10. Accordingly, more liquid crystal material 14 contained by the container 12 can be injected into the cell gap of the unit panel 1 and at an increased injection rate. As mentioned above, once the liquid crystal material 14 completely fills the cell gap of the unit panel 1, the injection hole 16 is sealed by a sealant and the injected liquid crystal material 14 is sealed within the unit panel 1. The injection method described above, therefore, is generally known as a vacuum injection method.

Despite their usefulness, the aforementioned dipping and vacuum injection method methods can be problematic for several reasons.

First, the total amount of time required to completely fill the cell gap of the unit panel 1 with liquid crystal material 14, according to the dipping/vacuum injection methods, can be relatively long. Specifically, a cell gap thickness of the unit panel 1 is only a few micrometers wide. Therefore, only a small amount of liquid crystal material 14 can be injected into the unit panel 1 per unit time. For example, it can take about 8 hours to completely inject liquid crystal material 14 into the cell gap of a 15-inch liquid crystal display panel, thereby reducing the efficiency with which LCD devices can be fabricated.

Second, the aforementioned dipping/vacuum injection methods require an excessively large amount of liquid crystal material 14 compared to the relatively small amount of liquid crystal material 14 actually injected into the unit panel 1. Because liquid crystal material 14 contained by the container 12 is exposed to the atmosphere, or certain other process gases during loading and unloading of the unit panel 1 into and out of the vacuum chamber 10, liquid crystal material 14 contained by the container 12 can easily become contaminated. Therefore, the uninjected liquid crystal material 14 must be discarded, thereby reducing the efficiency with which expensive liquid crystal material is used and increasing the cost of fabricating a unit panel 1.

SUMMARY OF THE INVENTION

Accordingly, the present invention is directed to an apparatus and method of dispensing liquid crystal material that substantially obviates one or more of the problems due to limitations and disadvantages of the related art.

An advantage of the present invention provides a liquid crystal dispensing apparatus capable of filtering liquid crystal material as it is dispensed onto a substrate, and a dispensing method thereof.

Another advantage of the present invention provides a liquid crystal dispensing apparatus capable of dispensing a precise amount of liquid crystal material onto a substrate, and a dispensing method thereof.

Still another advantage of the present invention provides for the removal of residual amounts of liquid crystal material accumulated on the surface of a nozzle.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal dispensing apparatus may, for example, include a container for containing liquid crystal material; a discharge pump for drawing in and discharging liquid crystal material within the container; a nozzle for dispensing the discharged liquid crystal onto a substrate; and a detecting means operably proximate to the nozzle for detecting the presence of residual liquid crystal material accumulated on the surface of the nozzle.

In one aspect of the present invention, the discharge pump may, for example, include a cylinder; a piston arranged within the cylinder, wherein the piston may be rotatable and axially translatable within the cylinder and wherein a lower portion of the piston may include a groove for drawing in liquid crystal material contained within the container and for discharging the drawn liquid crystal material; and a suction opening and a discharge opening through which the liquid crystal material is drawn and discharged, respectively.

In another aspect of the present invention, the liquid crystal dispensing apparatus may, for example, include at least one filter to filter the liquid crystal material before it is dispensed onto the substrate.

In still another aspect of the present invention, the liquid crystal dispensing apparatus may further include a motor driving unit for driving a motor that operates the discharge pump; an alignment driving unit for driving a substrate to align the nozzle with a dispensing position on the substrate (or for driving the liquid crystal dispensing apparatus to align the nozzle with a dispensing position on the substrate); a detecting means for detecting the presence of residual liquid crystal material accumulated on the surface of the nozzle; a dummy dispensing operating unit for dispensing liquid crystal material at a dummy location when it is detected that residual liquid crystal material has accumulated on the surface of the nozzle; and a control unit for stopping a normal dispensing operation of liquid crystal material when it is detected that residual liquid crystal material has accumulated on the surface of the nozzle.

In yet another aspect of the present invention, the liquid crystal dispensing apparatus may further include a cleaner for removing residual liquid crystal material detected on the surface of the nozzle.

According to principles of the present invention, a method of dispensing liquid crystal material may, for example, include determining whether residual liquid crystal material has accumulated on the surface of a nozzle of a liquid crystal dispensing apparatus; stopping the liquid crystal dispensing upon detecting the presence of residual liquid crystal material; removing the residual liquid crystal material; and, after performing the dummy dispensing operation, resuming a normal dispensing operation of liquid crystal material onto a substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

To resolve problems associated with the aforementioned related art dipping/vacuum injection methods, a liquid crystal dispensing method has been proposed. According to the liquid crystal dispensing method, a liquid crystal layer may be formed by dispensing liquid crystal material directly onto one of the upper or lower substrates. Subsequently, the dispensed liquid crystal material is spread over the substrate upon pressing and bonding the upper and lower substrates together (i.e., assembling the upper and lower substrates). Accordingly, liquid crystal layers may be formed quicker by employing the liquid crystal dispensing method than by employing the related art dipping/vacuum injection methods. Further, the liquid crystal dispensing method consumes less liquid crystal material than either of the related art dipping/vacuum injection methods.

Figure 4:
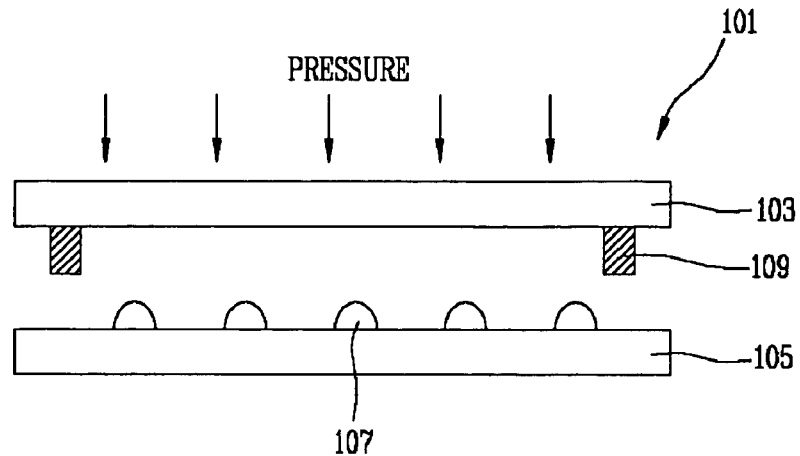
FIG. 4 illustrates a cross sectional view of an LCD device fabricated in accordance with a liquid crystal dispensing method of the present invention.

FIG. 4 illustrates a cross sectional view of an LCD device fabricated by applying the liquid crystal dispensing method.

Referring to FIG. 4, liquid crystal material 107 may be dispensed directly onto one of a lower substrate 105 or an upper substrate 103 prior to assembling the two substrates. In one aspect of the present invention, the lower substrate may include the aforementioned TFT array substrate. In another aspect of the present invention, the upper substrate may include the aforementioned color filter substrate. Sealant material 109 may be applied to peripheral regions of one of the lower or upper substrates 105 or 103, respectively. As mentioned above, the dispensed liquid crystal material 107 spreads between the lower and upper substrates 105 and 103 as the substrates are pressed and bonded together to form an LCD panel 101 having a liquid crystal layer with a substantially uniform thickness.

Figure 5:
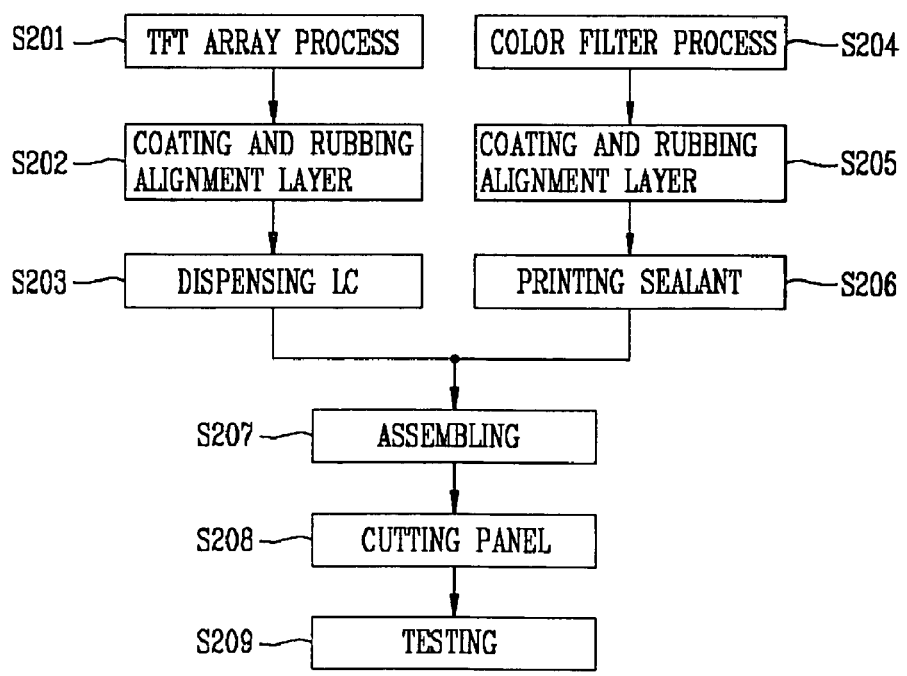
FIG. 5 illustrates a flow chart of a method of fabricating an LCD device according to a liquid crystal dispensing method.

FIG. 5 illustrates a flow chart of a method of fabricating an LCD device according to a liquid crystal dispensing method.

At step S201, an array of driving devices, such as TFTs, may be formed on an upper substrate 103 in a TFT array substrate forming process. In one aspect of the present invention, the TFT array substrate forming process may include steps of forming a plurality of gate lines and data lines on the lower substrate 5 to define an array of pixel areas; connecting TFTs to the gate and the data lines within each pixel area; and connecting pixel electrodes to the TFTs.

At step S204, a color filter layer may be formed on a lower substrate 105 in a color filter substrate forming process. In one aspect of the present invention, the color filter process may include steps of forming R, G, and B color filter layers, for realizing predetermined colors, and a common electrode on the upper substrate 3.

In one aspect of the present invention, the upper and lower substrates 103 and 105, respectively may be provided as glass substrates having an area of at least about 1000×1200 mm$^2$. It will be appreciated, however, that the upper and lower substrates 103 and 105 may be formed of glass substrates having a smaller area.

At steps S202 and S205, alignment layers may be formed over the entire surface of both the lower and upper substrates. Subsequently, the alignment layers may be imparted with alignment structures via processes such as rubbing, irradiation to predetermined wavelengths of electromagnetic radiation, or the like.

At step S203, liquid crystal material may be dispensed directly onto a unit panel area defined, for example, on the lower substrate 105. At step S206, sealant material may be printed at peripheral regions of a unit panel area defined, for example, on the upper substrate 103. At step S207, the upper and lower substrates 103 and 105 may be aligned and subsequently pressed and bonded together (i.e., assembled). Upon assembling the upper and lower substrates 103 and 105, the dispensed liquid crystal material may be evenly spread between the upper and lower substrates within a region defined by the sealant material.

At step S208, the assembled upper and lower substrates may be cut into a plurality of unit LCD panels. Finally, at step S209, the unit LCD panels may be tested.

In view of the discussion above, fabricating unit LCD panels using the liquid crystal dispensing method is different from fabricating unit LCD panels using the related art dipping/vacuum injection methods.

Figure 1:
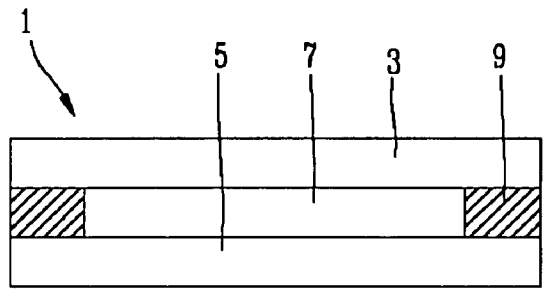
FIG. 1 illustrates a cross sectional view of a related art LCD device.
Figure 2:
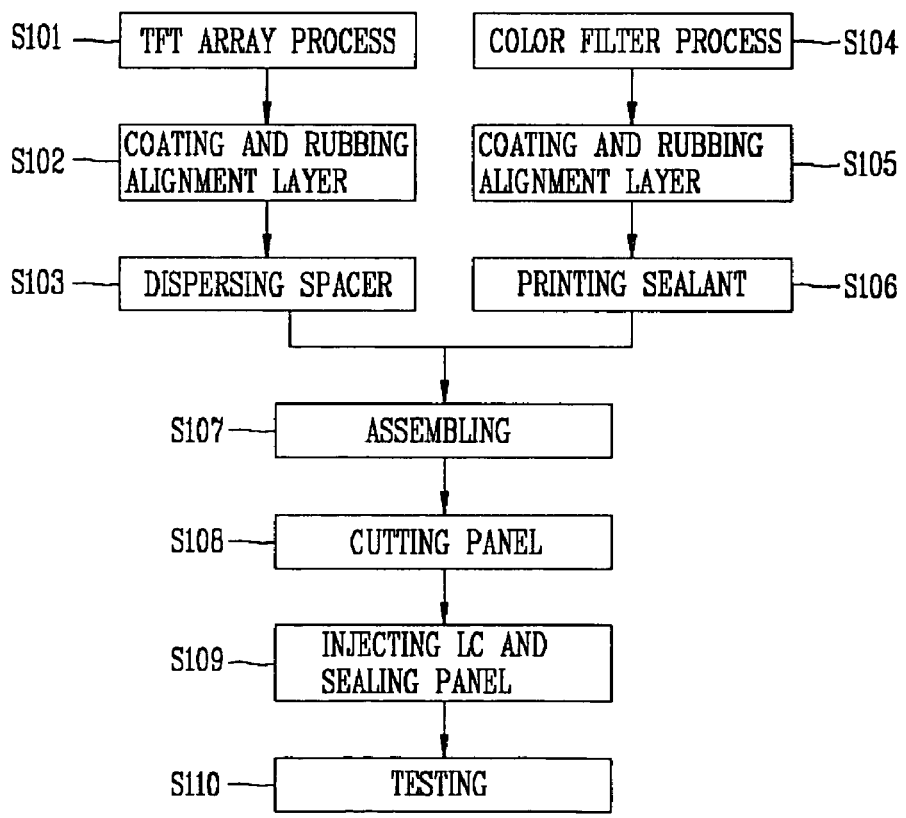
FIG. 2 illustrates a flow chart of a related art method for fabricating the LCD device shown in FIG. 1.
Figure 3:
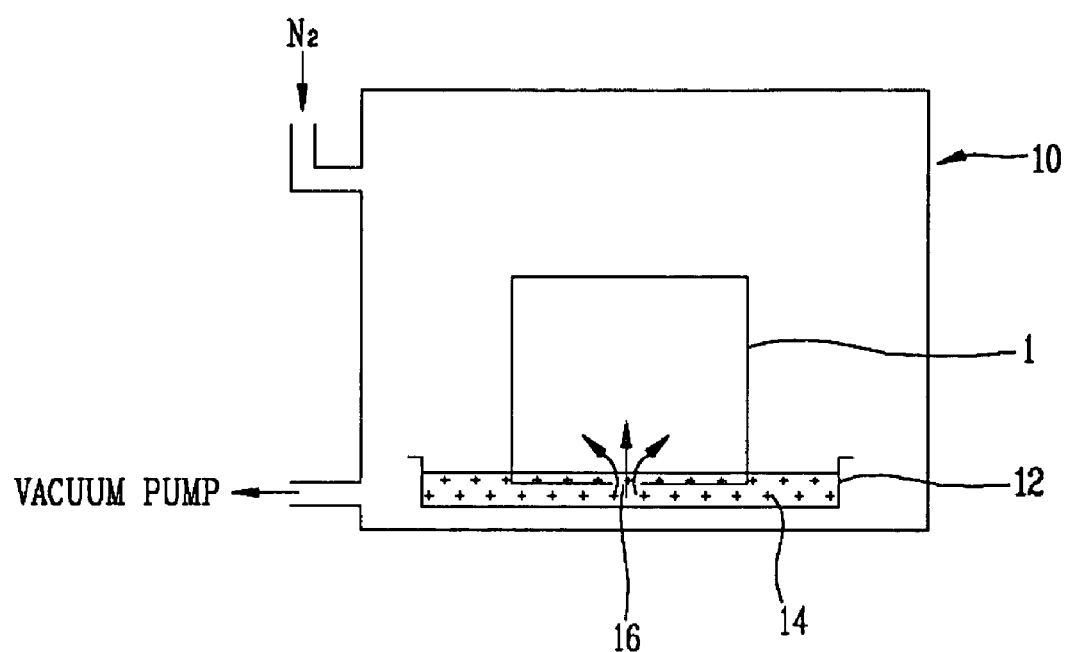
FIG. 3 illustrates a related art liquid crystal injection system for fabricating the related art LCD device.

Specifically, the related art fabrication processes as illustrated in FIG. 2 involve injecting liquid crystal material into a predefined cell gap through a liquid crystal injection hole defined within sealant material followed by sealing the liquid crystal injection hole. Although not shown in FIG. 2, upon injecting the liquid crystal material 14 into the cell gap of the unit panel 1 (see FIG. 3), outer surfaces of the unit panel 1 contact liquid crystal material 14 contained within the container 12 and must be washed after the cell gap is completely filled with liquid crystal material 14.

The liquid crystal dispensing processes illustrated in FIG. 5, however, involve dispensing liquid crystal material directly onto a substrate, thereby eliminating the need to form any seal or liquid crystal injection hole. Moreover, because the liquid crystal material is dispensed directly onto the substrate, outer surfaces of a subsequently LCD panel need not be washed to remove liquid crystal material. Accordingly, LCD panels may be fabricated more simply using the liquid crystal dispensing method than using the related art dipping/vacuum injection methods. Further, the liquid crystal dispensing method has a higher yield than the related art dipping/vacuum injection methods.

To fabricate LCD panels using the liquid crystal dispensing method, dispensing positions (i.e., positions on a substrate where droplets of liquid crystal material are to be dispensed) and dispensing amounts (i.e., amounts of liquid crystal material within each droplet of liquid crystal material) heavily influence the formation of a liquid crystal layer having a desired thickness. Because the thickness of a liquid crystal layer is closely related to a cell gap of the LCD panel, dispensing positions and amounts must controlled precisely to avoid fabricating a defective LCD panel. Accordingly, the principles of the present invention provide a liquid crystal dispensing apparatus that ensures that actual dispensing positions and amounts are precisely controlled to match predetermined dispensing positions and amounts.

Figure 6:
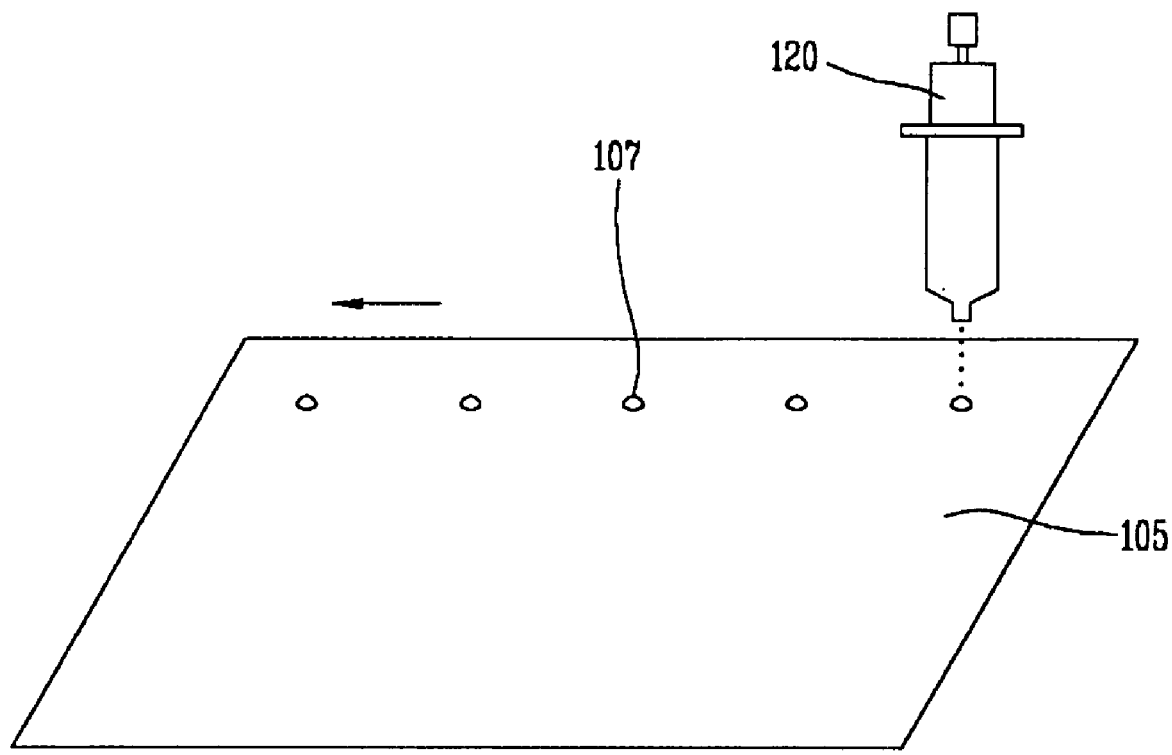
FIG. 6 illustrates a liquid crystal dispensing method.

FIG. 6 illustrates a liquid crystal dispensing method in accordance with principles of the present invention.

Referring to FIG. 6, the liquid crystal dispensing apparatus may be arranged above the lower substrate 105 (e.g., a glass substrate). Further, droplets of liquid crystal material 107 may be dispensed from the liquid crystal dispensing apparatus 120.

In one aspect of the present invention, droplets of liquid crystal 107, spaced apart from each other at predetermined distances, may be formed by fixing a position of the lower substrate 105, moving the liquid crystal dispensing apparatus 120 along x- and y-directions at a predetermined speed, and causing the liquid crystal dispensing apparatus 120 to discharge predetermined amounts of liquid crystal material within predetermined time intervals onto the lower substrate 105. Due to the movement and possible vibration of the liquid crystal dispensing apparatus 120, droplets of the liquid crystal material 107 may be undesirably misshapen, contain more or less liquid crystal material than a predetermined dispensing amount, and not be aligned with predetermined dispensing positions. To cure such potential defects, and in an alternate aspect of the present invention, droplets of liquid crystal 107, spaced apart from each other at predetermined distances, may be formed by fixing a position of the liquid crystal dispensing apparatus 120, moving the substrate 105 along x- and y-directions at a predetermined speed, and causing the liquid crystal dispensing apparatus 120 to discharge predetermined amounts of liquid crystal material within predetermined time intervals onto the lower substrate 105.

Figure 7:
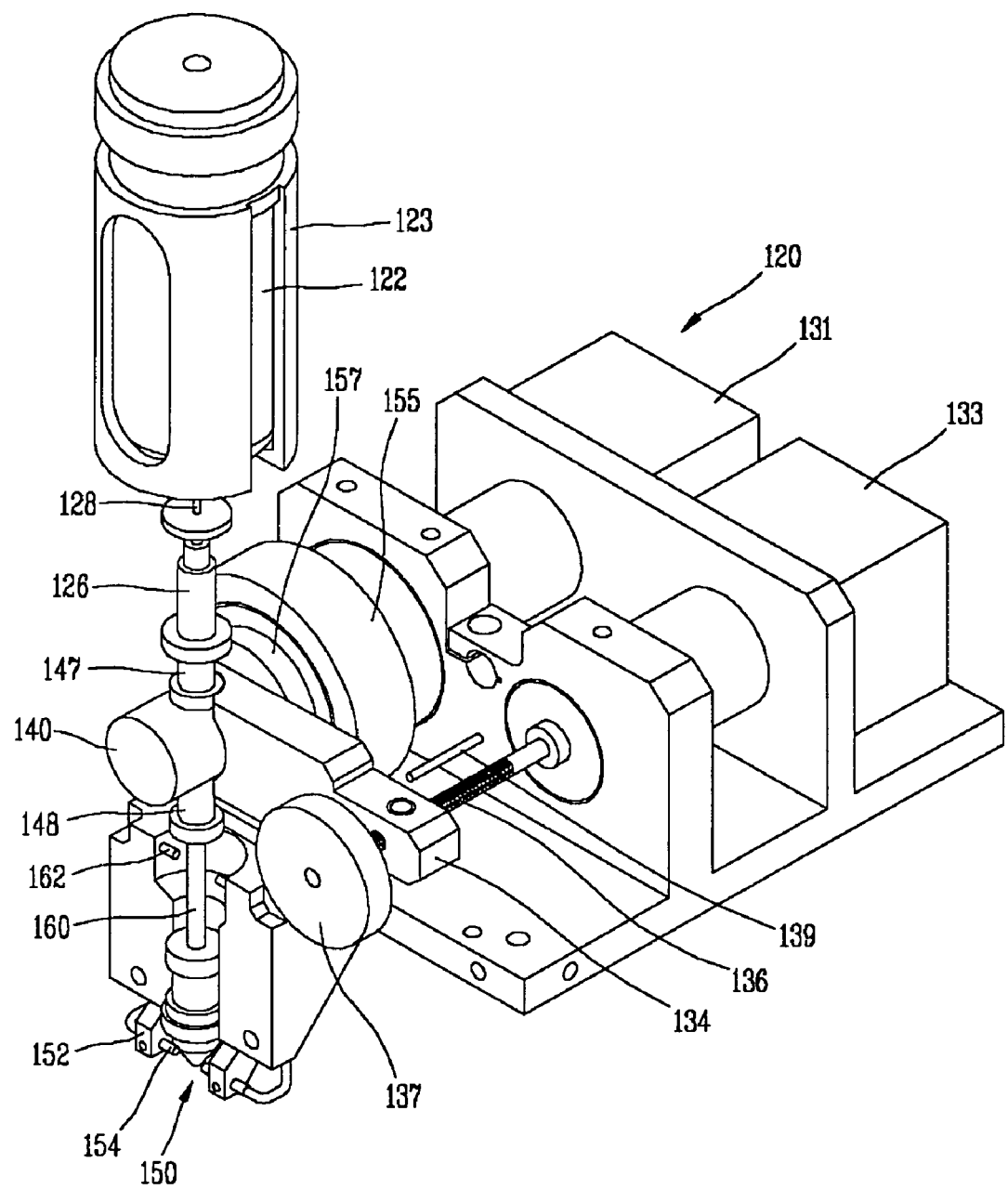
FIG. 7 illustrates a perspective view of a liquid crystal dispensing apparatus according to principles of the present invention.
Figure 8:
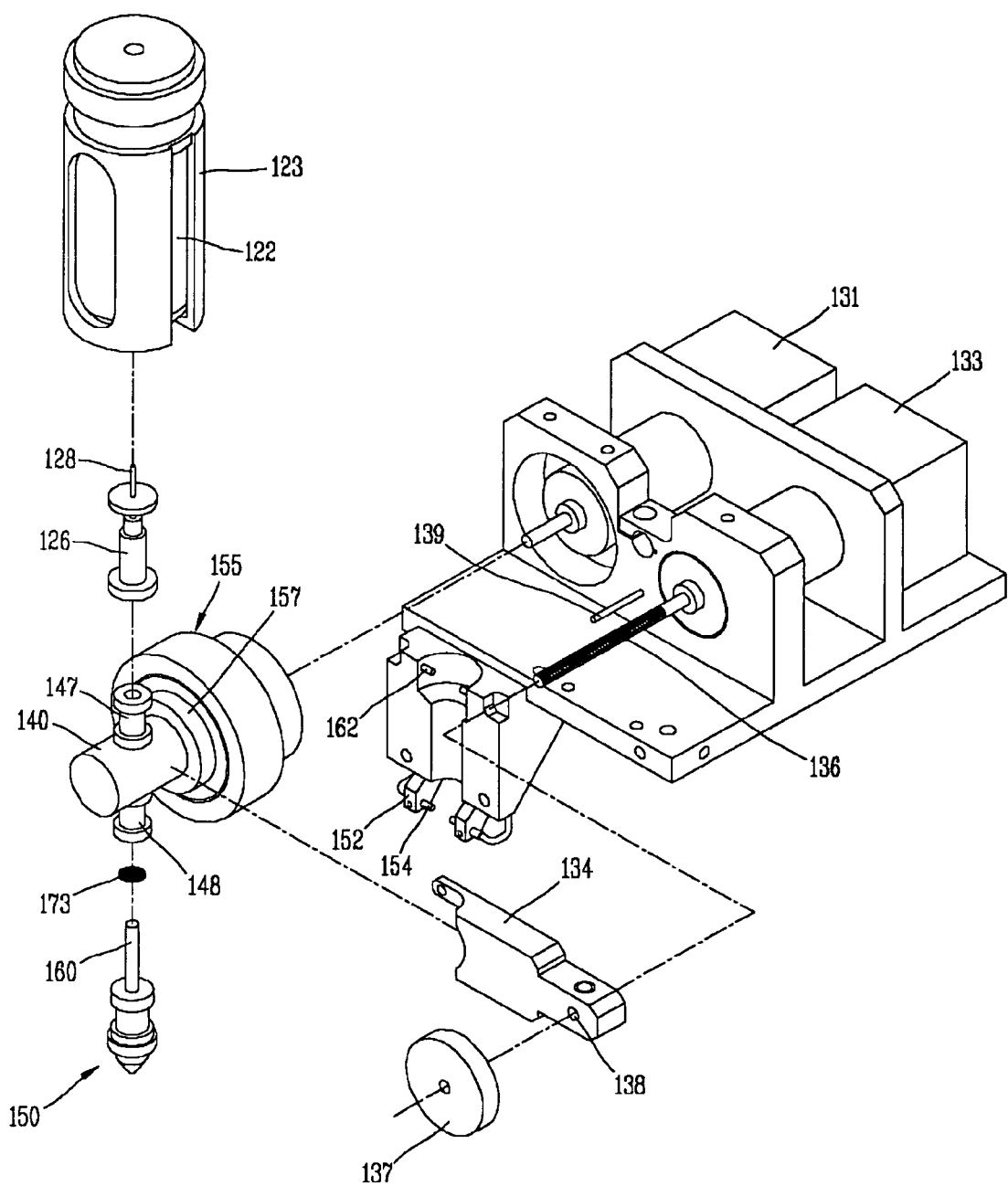
FIG. 8 illustrates an exploded perspective view of the liquid crystal dispensing apparatus shown in FIG. 7.

FIG. 7 illustrates a perspective view of a liquid crystal dispensing apparatus according to principles of the present invention. FIG. 8 illustrates an exploded perspective view of the liquid crystal dispensing apparatus shown in FIG. 7.

Referring to FIGS. 7 and 8, the liquid crystal dispensing apparatus 120 of the present invention may, for example, include a liquid crystal material container 122. Accordingly, the droplets of liquid crystal material 107 may, for example, be dispensed from the liquid crystal container 122.

In one aspect of the present invention, the liquid crystal material container 122 may, for example, be cylindrically shaped. In another aspect of the present invention, the liquid crystal material container 122 may be formed of an easily deformable material (e.g., polyethylene, or the like).

According to principles of the present invention, the droplets of liquid crystal material 107 may be imprecisely dispensed onto a substrate if the liquid crystal material container 122 deforms during the dispensing. Accordingly, the liquid crystal material container 122, provided as described above, may be accommodated within a case 123, wherein the case 123 may, for example, be formed of a material that is relatively difficult to deform compared to the material from which the liquid crystal material container 122 is formed (e.g., stainless steel, or the like). Alternatively, the liquid crystal material container 122 itself may be formed of a material that does not easily deform (e.g., stainless steel, or the like) and the necessity of the case 123 may be eliminated altogether, thereby reducing the complexity and overall cost of the liquid crystal dispensing apparatus 120.

In one aspect of the present invention, the liquid crystal material container 122 may be formed of a material that is substantially inert with respect to the liquid crystal material (e.g., polyethylene, or the like). In another aspect of the present invention, however, the container 122 may be formed of any material and the interior walls of the liquid crystal material container 122 may be coated with a material such as a fluorine resin to prevent liquid crystal material contained therein from chemically reacting with sidewalls of the liquid crystal material container 122.

A gas supply tube (not shown) may be arranged at an upper portion of the liquid crystal material container 122 to transport an inert gas (e.g., nitrogen) into portions of the liquid crystal material container 122 that are not occupied by the liquid crystal material contained therein. In one aspect of the present invention, the gas may be used to pressurize the liquid crystal material container 122, facilitating the liquid crystal material contained therein to be dispensed onto the substrate.

According to principles of the present invention, a liquid crystal discharge pump 140 may be arranged at a lower portion of the container 122. The liquid crystal discharge pump 140 may be used to discharge liquid crystal material, contained within the container 122, onto a substrate. Therefore, a liquid crystal suction opening 147 may, for example, be formed at an upper portion of the liquid crystal discharge pump 140 and a liquid crystal discharge opening 148 may, for example, be formed at a lower portion of the liquid crystal discharge pump 140. During an operation of the liquid crystal dispensing apparatus 120, the liquid crystal suction opening 147 may, for example, convey liquid crystal material drawn from the container 122 into the liquid crystal discharge pump 140. Similarly, during an operation of the liquid crystal dispensing apparatus 120, the liquid crystal discharge opening 148 may, for example, convey liquid crystal material discharged from the liquid crystal discharge pump 140 to a nozzle 150.

According to principles of the present invention, a first connecting tube 126 may be coupled to the liquid crystal suction opening 147. In one aspect of the present invention, the liquid crystal suction opening 147 may be coupled to the first connecting tube 126 by being inserted into the first connecting tube 126. In another aspect of the present invention, the liquid crystal suction opening 147 may be coupled to the first connecting tube 126 via a coupling means (e.g., a screw, or the like). In still another aspect of the present invention, the liquid crystal suction opening 147 may be integrally formed with the first connecting tube 126.

According to principles of the present invention, a hollow pin 128 (e.g., an injection needle) may be formed at one side of the first connecting tube 126 and a pad (not shown), formed of a highly compressible material and capable of forming a hermetic seal (e.g., silicon, butyl rubber material, or the like), may be arranged at a lower portion of the container 122. According to principles of the present invention, the pin 128 may be inserted through the pad and into the container 122. Upon insertion of the pin 128, the pad presses against the outside wall the pin 128, preventing liquid crystal material from leaking outside of the pin 128, and liquid crystal material contained within the container 122 may be transported into the liquid crystal suction opening 147. Because the liquid crystal suction opening 147 and the container 122 are coupled to each other via the pin/pad structure discussed above, the liquid crystal suction opening 147 may be simply coupled and decoupled to the container 122.

According to principles of the present invention, the nozzle 150 may be connected to the liquid crystal discharge opening 148 via a second connecting tube 160 to facilitate the dispensing of liquid crystal material discharged from the liquid crystal discharge pump 140 onto the substrate. In one aspect of the present invention, the second connecting tube 160 may be formed of an opaque material. However, liquid crystal material contained within the liquid crystal material container 122 may, at some point, contain vapor (e.g., in the form of bubbles). For example, vapor may be introduced into the liquid crystal material at the liquid crystal discharge pump 140. The presence and amount of vapor cannot precisely controlled nor can it be completely removed before the liquid crystal material is dispensed onto the substrate, even if a vapor removing device is employed. When the liquid crystal material contains vapor, the dispensing positions and dispensing amounts of discrete units of dispensed liquid crystal material cannot be precisely controlled and a defective LCD panel can be potentially fabricated. Therefore, the best way to prevent the dispensing positions and dispensing amounts from being imprecisely controlled is to stop the operation of the liquid crystal dispensing apparatus as soon as it is determined that vapor is present. Accordingly, and in an alternative aspect of the present invention, the second connecting tube 160 may be formed of a suitably transparent material, enabling a suitable visual inspection to determine the presence of vapor contained within the liquid crystal material and ensuring that dispensing positions and dispensing amounts may be precisely controlled. A first sensor 162 (e.g., a photo coupler, or the like) may be arranged at opposing sides of the second connecting tube 160 to detect the presence of vapor within the discharged liquid crystal material.

Referring specifically to FIG. 8, at least one filter 173 may be provided to substantially remove particles entrained within the liquid crystal material as it is drawn into the liquid crystal discharge pump 140 and/or to substantially remove particles entrained within the liquid crystal material as it is discharged by the liquid crystal discharge pump 140.

For example, a filter 173 may be provided at substantially any stage along the path that the liquid crystal material takes from the container 122 until it is drawn into the liquid crystal discharge pump 140. In one aspect of the present invention, the filter 173 may, for example, be provided within an end portion of the liquid crystal suction opening 147. In another aspect of the present invention, the filter may, for example, be provided between the first connecting tube 126 and the liquid crystal suction opening 147.

As will be discussed in greater detail below, the liquid crystal discharge pump 140 includes a piston that is rotatable and axially translatable within a cylinder. Thus, upon operating the piston, liquid crystal material contained within the container 122 may be drawn into the liquid crystal discharge pump 140 via the liquid crystal suction opening 147 and subsequently discharged onto a substrate via the liquid crystal discharge opening 148. During operation of the liquid crystal discharge pump 140, however, particles may be created as a result of friction between the piston and the cylinder. These particles may become entrained within the discharged liquid crystal material that is eventually dispensed onto the substrate as contaminated liquid crystal droplets. The presence of contaminated liquid crystal droplets cause subsequently formed unit LCD panels to be defective. Therefore, the filter 173 may substantially remove particles entrained within the discharged liquid crystal material before it is dispensed onto the substrate.

For example, the filter 173 may be provided at substantially any stage along the path that the discharged liquid crystal material takes until it is dispensed onto the substrate. In one aspect of the present invention, the filter 173 may, for example, be provided between the second connecting tube 160 and the liquid crystal discharge opening 148. In another aspect of the present invention, the filter 173 may, for example, be provided within the second connecting tube 160. In still another aspect of the present invention, the filter 173 may, for example, be provided within the liquid crystal discharge opening 148 of the liquid crystal discharge pump 140. In yet another aspect of the present invention, the filter 173 may, for example, be provided between the second connecting tube 160 and the nozzle 150. In still another aspect of the present invention, the filter 173 may, for example, be provided at and/or within the nozzle 150.

According to principles of the present invention, the filter 173 may be integrally or separably formed with any of the liquid crystal container 122, the liquid crystal suction opening 147, the liquid crystal discharge opening 148, the second connecting tube 160, or the nozzle 150. If the filter 173 is separably formed with the aforementioned structures, the filter 173 may be periodically cleaned and used at least semi-permanently. If the filter 173 is integrally formed with, for example, the nozzle, the nozzle 150 and filter 173 may be discarded after a predetermined amount of liquid crystal material has been dispensed.

According to principles of the present invention, the liquid crystal discharge pump 140 may be coupled to (e.g., inserted into) a rotating member 157. The rotating member 157 may be fixed to a fixing unit 155 and coupled to a first motor 131. Therefore, as the first motor 131 is operated, the rotating member 157 rotates which, in turn, causes the liquid crystal discharge pump 140 to dispense liquid crystal material contained within the liquid crystal container 122 onto a substrate.

According to principles of the present invention, the amount of liquid crystal material discharged from the liquid crystal material container 122 via the liquid crystal discharge pump 140 may be varied in accordance with a fixation angle between the liquid crystal discharge pump 140 and the rotating member 157 (i.e., the angle at which a portion of the liquid crystal discharge pump 140 is fixed to the rotating member 157). Therefore, the liquid crystal discharge pump 140 may, for example, contact a first end of a bar shaped liquid crystal capacity amount controlling member 134. A hole 138 may be formed at a second end of the liquid crystal capacity amount controlling member 134 and a rotational shaft 136 may be inserted into the hole 138. A first end of the rotational shaft 136 may be connected to a second motor 133 and a second end of the rotational shaft 136 may be connected to an angle controlling lever 137. The rotational shaft 136 may be rotated either automatically upon driving the second motor 133 or manually upon operating the angle controlling lever 137. A screw (not shown) may be formed at a periphery of the hole 138 and the rotational shaft 136 so as to couple the liquid crystal capacity amount controlling member 134 to the rotational shaft 136. Upon rotating the rotational shaft 136, the second end of the liquid crystal capacity amount controlling member 134 may move along a linear axis of the rotational shaft 136, wherein the direction of the rotating determines the direction in which the second end of the liquid crystal capacity amount controlling member 134. As a result of the movement of the second end of the liquid crystal capacity amount controlling member 134, the fixation angle may be varied.

Accordingly, the first motor 131 may operate to cause the liquid crystal discharge pump 140 to dispense liquid crystal material from the liquid crystal material container 122 onto the substrate while the second motor 133 may operate to control the fixation angle and thus to control the amount of liquid crystal material dispensed by the liquid crystal discharge pump 140 during its operation.

According to principles of the present invention, dispensing amounts of droplets of liquid crystal material are very minute. Further, variations in the dispensing amounts are also very minute. Therefore, minute variations in the fixation angle must be precisely controlled. To effect such precise control in the fixation angle, the second motor 133 may be provided as a step motor operated by a pulse input value, a servo motor, or the like.

Figure 9A:
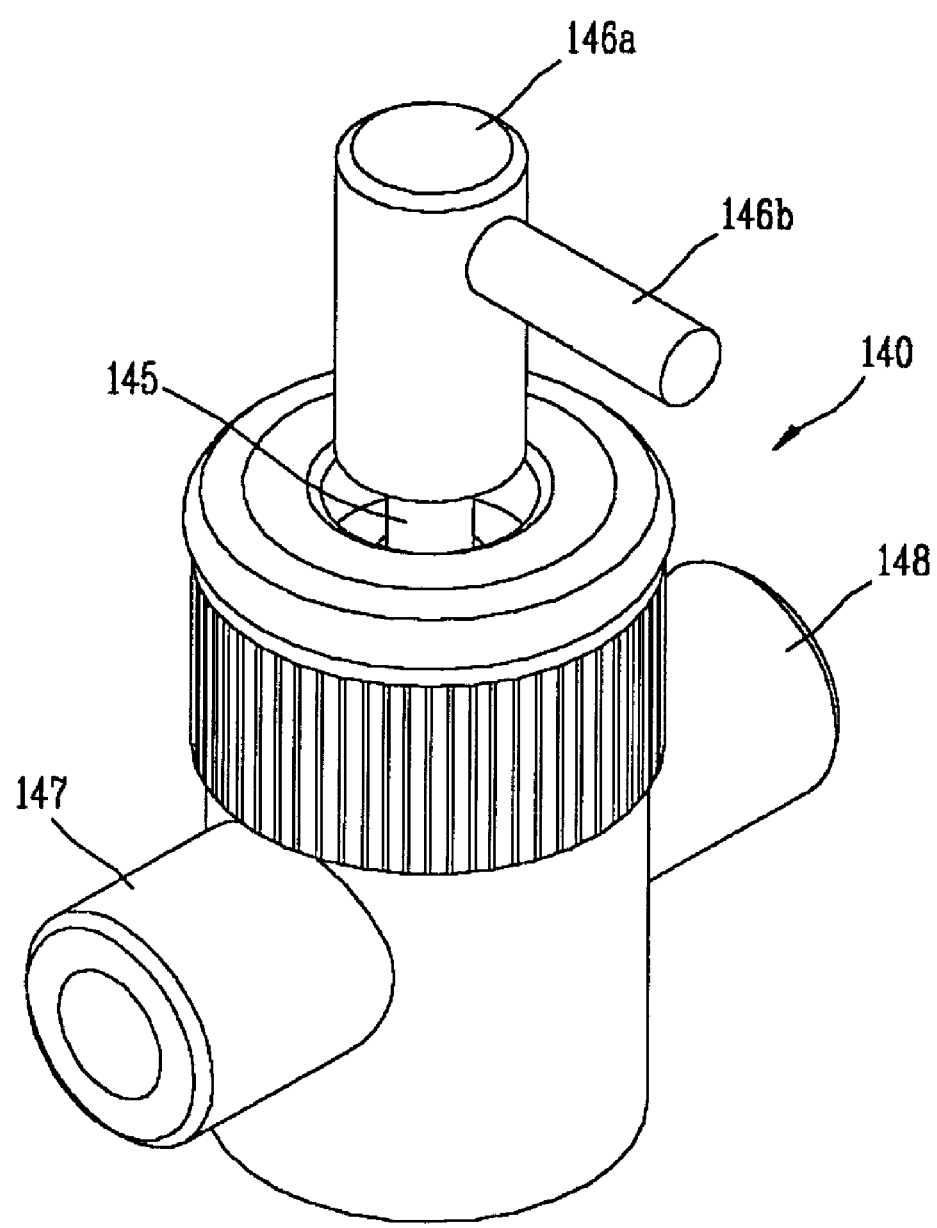
FIG. 9A illustrates a perspective view of a liquid crystal discharge pump of the liquid crystal dispensing apparatus according to principles of the present invention.
Figure 9B:
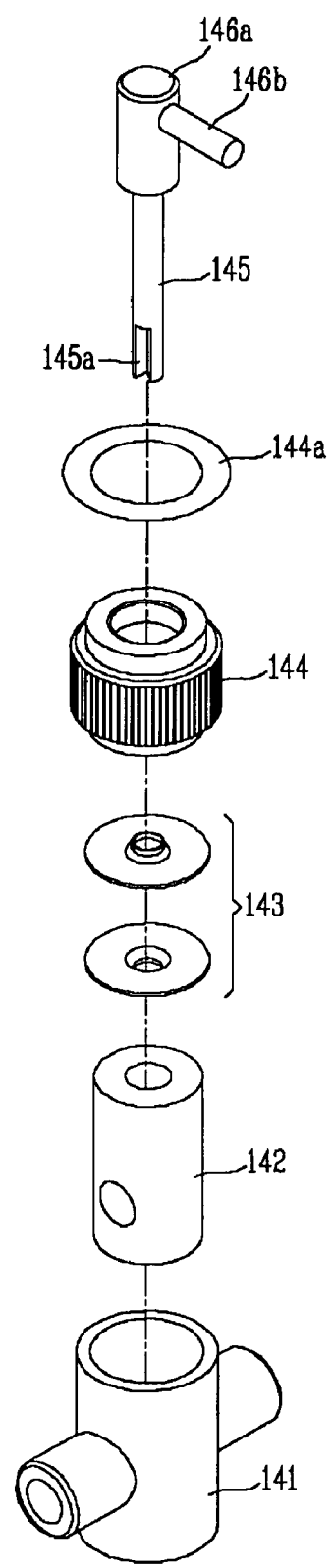
FIG. 9B illustrates an exploded perspective view of the liquid crystal discharge pump shown in FIG. 9A.

FIG. 9A illustrates a perspective view of a liquid crystal discharge pump of the liquid crystal dispensing apparatus according to principles of the present invention. FIG. 9B illustrates an exploded perspective view of the liquid crystal discharge pump shown in FIG. 9A.

Referring to FIGS. 9A and 9B, the liquid crystal discharge pump 140 of the present invention may, for example, include a case 141, wherein the case 141 includes the liquid crystal suction and discharge openings 147 and 148; a cap 144 coupled to the case 141, wherein an upper portion of the cap 144 includes an opening; a cylinder 142 arranged within the case 141 for conveying liquid crystal material drawn from the liquid crystal container 122; a sealing means 143 for sealing the cylinder 142; an o-ring 144*a* arranged at an upper portion of the cap 144 for preventing liquid crystal material from leaking outside the liquid crystal discharge pump 140; a piston 145 arranged within the cylinder 142 through the opening of cap 144, the piston 145 being rotatable and axially translatable within the cylinder 142 (e.g., along the vertical axis as illustrated in FIGS. 9A and 9B) for drawing in and discharging liquid crystal material through the liquid crystal suction opening 147 and the liquid crystal discharge opening 148, respectively; a head 146*a* arranged at an upper portion of the piston 145 and fixed to the rotating member 157; and a bar 146*b* arranged at the head 146*a*. In one aspect of the present invention, the bar 146*b* may be inserted within a hole (not shown) of the rotating member 157. Accordingly, the piston 145 may rotate when the rotating member 157 is rotated by the first motor 131.

Referring to FIG. 9B, a groove 145*a* may be formed at an end portion of the piston 145. In one aspect of the present invention, the groove 145*a* may occupy no more than about 25% of a cross-sectional area of the piston 145. In another aspect of the present invention, the groove 145*a* may open and close the liquid crystal suction opening 147 and the liquid crystal discharge opening 148 upon rotating the piston 145 to draw in and discharge liquid crystal material through the liquid crystal suction opening 147 to the liquid crystal discharge opening 148.

An exemplary operation of the liquid crystal discharge pump 140 will now be explained in greater detail below with reference to FIG. 10.

Figure 10:
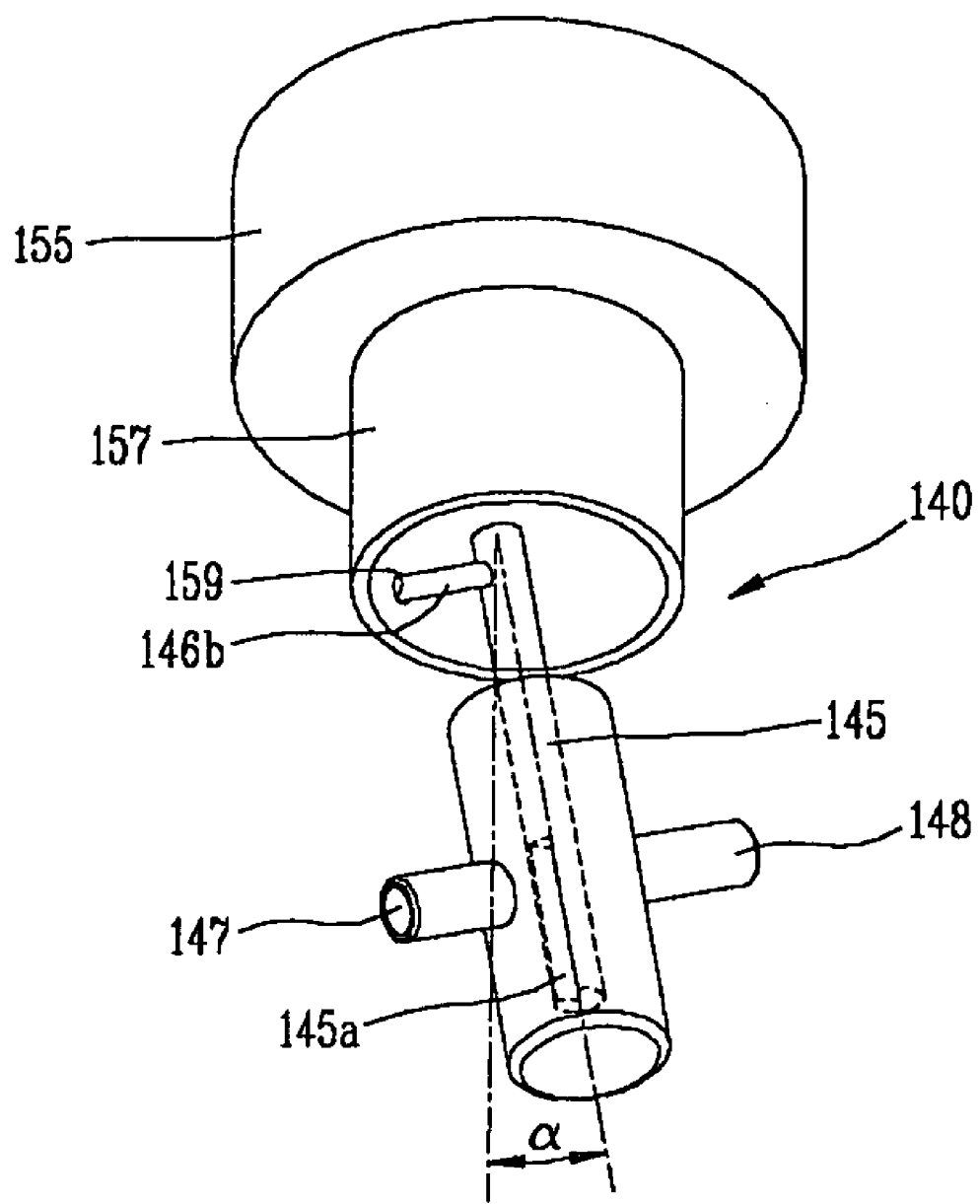
FIG. 10 illustrates a view of the liquid crystal discharge pump fixed to a rotating member at a fixation angle.

Referring to FIG. 10, the piston 145 of the liquid crystal discharge pump 140 may be fixed to the rotating member 157 at a predetermined angle, α(i.e., the fixation angle). For example, the bar 146*b* formed at the piston head 146*a* may be inserted into a hole 159 formed within the rotating member 157 to fix the piston 145 to the rotating member 157. Because the bar 146*b* is fixed within the hole 159, the piston 145 rotates as the rotating member 157 rotates. A bearing (not shown) may be provided within the hole 159 to allow the bar 146*b* of the piston 145 to move in back and forth and right and left directions with respect to the hole 159. Upon operating the first motor 131, the rotating member 157 may be rotated and to rotate piston 145 fixed thereto.

If the fixation angle (α) is 0°, the piston 145 rotates only about the axis of the rotating member 157. However, if the fixation angle (α) of the piston 145 is substantially not 0°, the piston 145 may rotate about an off-axis angle with respect to the rotating member 157 (e.g., transverse and longitudinal rotation).

For example, the piston 145 may be rotated a predetermined amount within an interior space of the cylinder 142 to allow liquid crystal material within the liquid crystal suction opening 147 to be drawn into the cylinder 142. Upon rotating the piston 145 within the cylinder 142 further, liquid crystal material drawn into the cylinder 142 may be discharged into the liquid crystal discharge opening 148. To facilitate the aforementioned drawing-in (or suction) and discharge operations, the groove 145*a* may be selectively arranged to be in fluid communication with the liquid crystal suction and discharge openings 147 and 148, as will be discussed in greater detail with respect to FIGS. 11A to 11D.

Figure 11A:
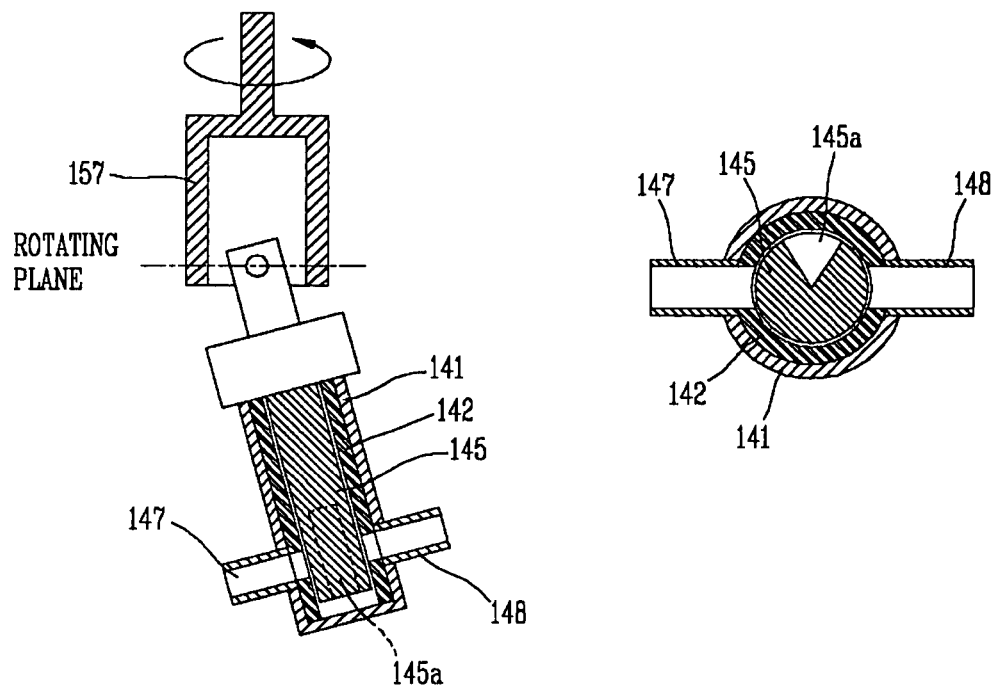
FIGS. 11A to 11D operational views of the liquid crystal discharge pump according to principles of the present invention.
Figure 11B:
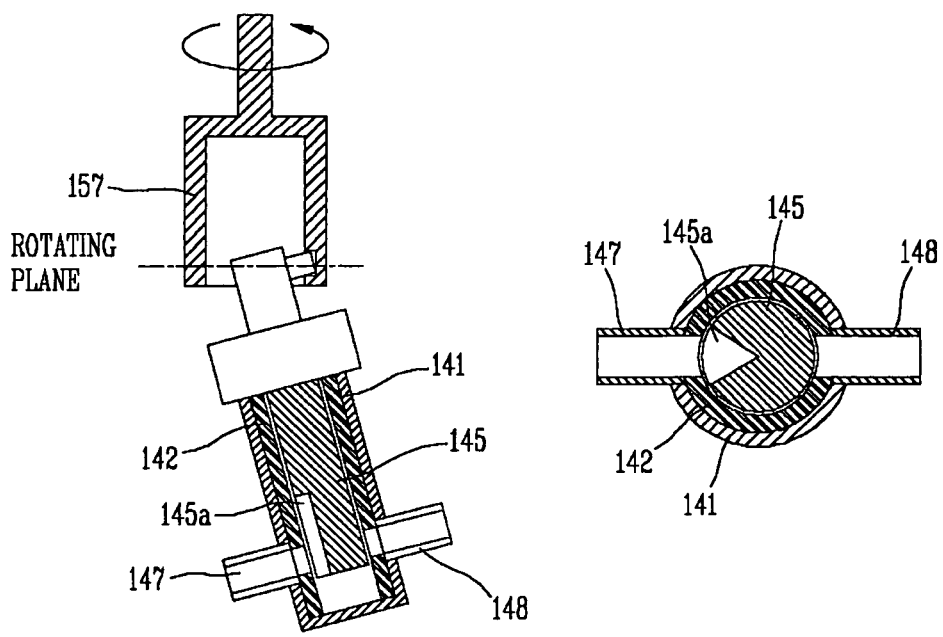
Figure 11C:
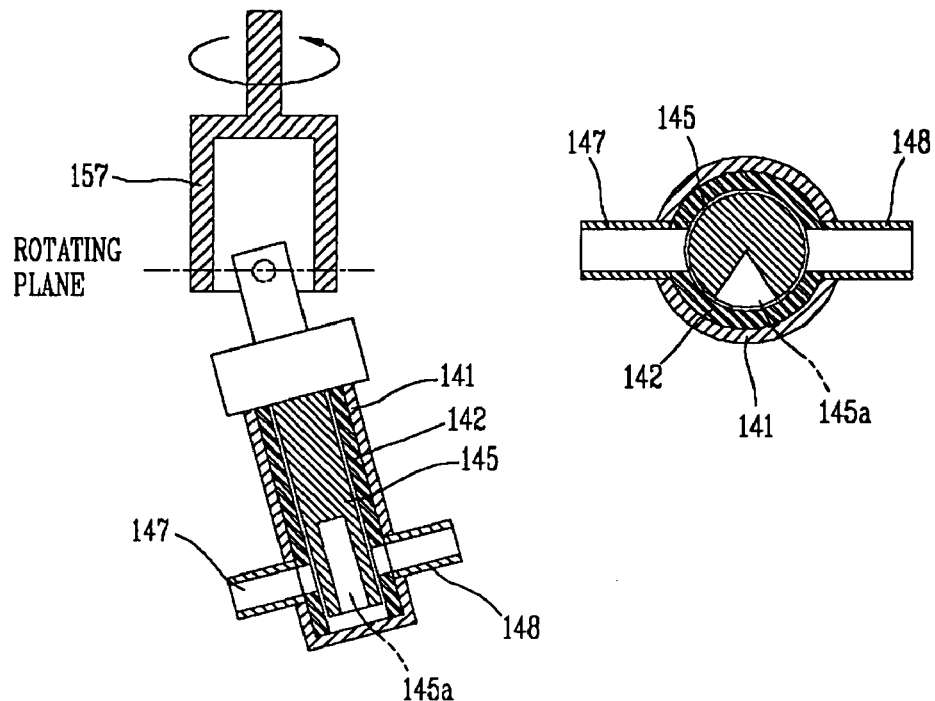
Figure 11D:
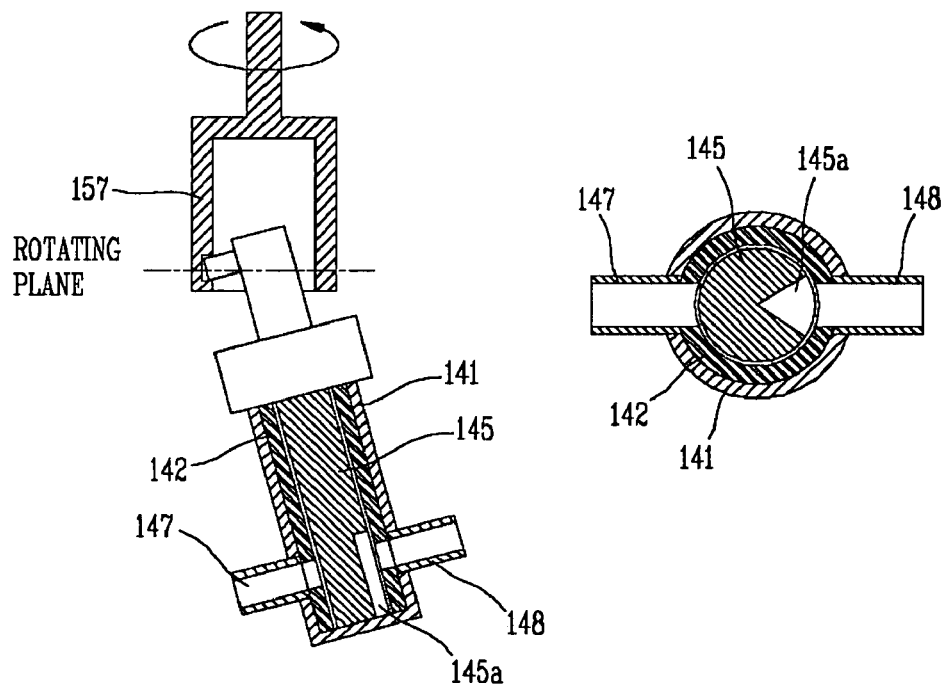

Referring generally to FIGS. 11A to 11D, liquid crystal material contained within the liquid crystal material container 122 is discharged to the nozzle 150 through four strokes of the liquid crystal discharge pump 140. FIGS. 11A and 11C illustrate cross strokes, FIG. 11B illustrates a suction stroke at the liquid crystal suction opening 147, and FIG. 11D illustrates a discharge stroke at the liquid crystal discharge opening 148.

Referring specifically to FIG. 11A, the piston 145, fixed to the rotating member 157 at the fixation angle (α), rotates in accordance with the rotation of the rotating member 157. In the cross stroke shown in FIG. 11A, both the liquid crystal suction opening 147 and the liquid crystal discharge opening 148 are closed by the piston 145.

Upon rotating the rotating member 157 approximately 45°, the piston 145 rotates within the cylinder 142 to arrange the groove 145*a* to be in fluid communication with the liquid crystal suction opening 147, as shown in FIG. 11B. Because the piston 145 is fixed to the rotating member 157 at a predetermined fixation angle, the bar 146*b* rotates along the plane in which the rotating member 157 rotates while the piston 145 moves axially out of the cylinder 142 and rotates within the cylinder 142 to arrange the groove 145*a* in fluid communication with the liquid crystal suction opening 147. Upon arranging the groove 145*a* to be in fluid communication with the liquid crystal suction opening 147, liquid crystal material within the liquid crystal suction opening 147 is drawn into the cylinder 142 and groove 145*a*. The suction stroke illustrated in FIG. 11B, arranging the groove 145*a* in fluid communication with the liquid crystal suction opening 147, thus 'opens' the liquid crystal suction opening 147.

Upon further rotating the rotating member 157 approximately 45°, the piston 145 rotates within the cylinder 142 to arrange the groove 145*a* between the liquid crystal suction and discharge openings 147 and 148, as shown in FIG. 11C. The cross stroke illustrated in FIG. 11C, arranging the groove 145*a* between the liquid crystal suction and discharge openings 147 and 148, thus 'closes' the liquid crystal suction opening 147.

Upon further rotating the rotating member 157 approximately 45°, the piston 145 moves axially into the cylinder 142 and rotates within the cylinder 142 to arrange the groove 145 to be in fluid communication with the liquid crystal discharge opening 148, as shown in FIG. 11D. Upon arranging the groove 145*a* to be in fluid communication with the liquid crystal discharge opening 148, liquid crystal material is discharged from the cylinder 142 and groove 145a into the liquid crystal discharge opening 148. The discharge stroke illustrated in FIG. 11D, arranging the groove 145a to be in fluid communication with the liquid crystal discharge opening 148, thus 'opens' the liquid crystal discharge opening 148.

As described above, the liquid crystal discharge pump 140 repeats four consecutive strokes (i.e., the first cross stroke, the suction stroke, the second cross stroke, and the discharge stroke), to discharge the liquid crystal material, contained in the liquid crystal material container 122, to the nozzle 150. According to principles of the present invention, the amount of liquid crystal material discharged by the liquid crystal discharge pump 140 may be varied according to the fixation angle, $\alpha$, regulating the degree to which the piston 145 rotates off the axis of the rotating member 157.

Figure 12:
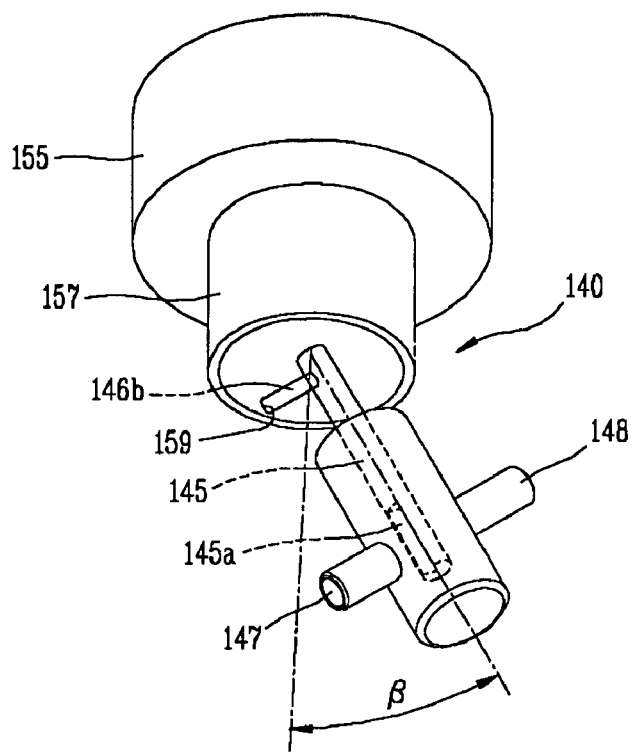
FIG. 12 illustrates a view of the liquid crystal discharge pump fixed to a rotating member at an increased fixation angle.

FIG. 12 illustrates a view the liquid crystal discharge pump fixed to the rotating member at a predetermined angle $\beta$.

As described above with respect to FIG. 10, the liquid crystal discharge pump 140 shown in FIG. 10 may be fixed to the rotating member 157 at a fixation angle $\alpha$. However, as shown in FIG. 12, the liquid crystal discharge pump 140 may be fixed to the rotating member 157 at a fixation angle of $\beta$, wherein $\beta > \alpha$. Accordingly, the degree of off-axis rotation of piston 145, with respect to the rotating member 157 shown in FIG. 12 may be greater than the degree of off-axis rotation of piston 145 shown in FIG. 10. Accordingly, as the fixation angle increases, the degree to which the piston 145 is axially translated along the axis of the cylinder 142 increases, thereby increasing the amount of liquid crystal material that may be drawn into, and discharged from, the cylinder 142 per revolution of the rotating member 157.

Therefore, the principles of the present invention allow the amount of liquid crystal material discharged to be controlled by adjusting the fixation angle. In one aspect of the present invention, the fixation angle may be controlled by the liquid crystal capacity amount controlling member 134 shown in FIG. 7. In another aspect of the present invention, the liquid crystal capacity amount controlling member 134 may be moved by driving the second motor 133. Therefore, the fixation angle may be controlled by adjusting the second motor 133. Alternatively, the fixation angle may be controlled by manually adjusting the angle controlling lever 137.

In one aspect of the present invention, the fixation angle of the liquid crystal discharge pump 140 may be measured by a sensor 139. In another aspect of the present invention, the sensor 139 may include a linear variable differential transformer. Accordingly, if the fixation angle exceeds a predetermined angle, the sensor 139 may communicate an alarm to a user, preventing the liquid crystal discharge pump 140 from being damaged.

As described above, the principles of the present invention provide a liquid crystal dispensing apparatus capable of precisely controlling the amount of liquid crystal material dispensed through a nozzle 150 and onto a substrate by varying a fixation angle of the liquid crystal discharge pump 140 (e.g., via the second motor 133) and by driving the liquid crystal discharge pump 140 via operating the first motor 131.

However, due to various factors, the amount of liquid crystal material dispensed onto the substrate may be less than a predetermined amount. In one instance, the actual amount of liquid crystal material dispensed may deviate from the predetermined amount may occur when liquid crystal material accumulates on the surface of the nozzle 150. Over repeated dispensing operations, such accumulated, non-dispensed liquid crystal material, form a mass of residual liquid crystal material 107a (see FIG. 13).

The mass of residual liquid crystal material 107a is accumulated because the nozzle 150 is formed of a metal such as stainless steel. Stainless steel has a high wetability (i.e., has a high surface energy/is highly hydrophilic) with respect to liquid crystal material. Therefore, the contact angle (i.e., the angle formed when a liquid is thermodynamically in equilibrium on the surface of a solid) formed between the nozzle 150 and the liquid crystal material is low and, therefore, liquid crystal material spreads over the surface of nozzle 150. Because the liquid crystal material spreads over the nozzle 150, the amount of liquid crystal material actually dispensed onto the substrate as a droplet is less than the predetermined amount, resulting in the fabrication of a defective LCD panel. Moreover, as the dispensing operation is repeated, portions of the residual liquid crystal material 107a may be dispensed with liquid crystal material discharged from the liquid crystal discharge pump 140. As a result, the amount of liquid crystal material actually dispensed onto the substrate as a droplet is greater than the predetermined amount, resulting in the fabrication of a defective LCD panel.

In theory, it may be possible to compensate for the mass of residual liquid crystal material and dispense more than the predetermined amount of liquid crystal material through the nozzle 150. In practice, however, this solution is not feasible because of the difficulty in calculating the amount of liquid crystal material that is accumulated on the surface of the nozzle 150.

Therefore, to reduce the accumulation of residual liquid crystal material on the surface of the nozzle 150, a material having a low wetability (i.e., a low surface energy/highly hydrophobic) with respect to the liquid crystal material and forming a large contact angle with liquid crystal material (e.g., fluorine resin, or the like), may be deposited on the surface of the nozzle 150 by any suitable method (e.g., dipping, spraying, or the like). Alternatively, the nozzle 150 may be completely formed from the material having a low wetability with respect to the liquid crystal material (e.g., fluorine resin, or the like). Such nozzle 150 may thus be used once or multiple times. By providing the nozzle 150 with the material having the low wetability, less liquid crystal material may spread over the surface of the nozzle 150 and more liquid crystal material may be dispensed onto the substrate through the nozzle 150. As a result, the amount of liquid crystal material actually dispensed onto the substrate as a droplet may approach the predetermined amount. The solution suggested above, however, does not sufficiently prevent the accumulation of residual liquid crystal material when fabricating LCD panels and when dispensing operations are repeatedly performed.

According to principles of the present invention, and with reference to FIGS. 7 and 8, a protection unit 152 may be arranged at a lower portion of the nozzle 150 to protect opposing sides of the nozzle 150 from external stresses, etc. Further, a second sensor 154 may be arranged at the protection unit 152 to detect the presence of vapor within the liquid crystal material dispensed from the nozzle 150 and/or to detect the presence of liquid crystal material accumulated on the surface of the nozzle 150. In one aspect of the present invention, the second sensor 154 may generate signals based on the presence and/or absence of liquid crystal material accumulated on the surface of the nozzle 150. In one aspect of the present invention, the second sensor 154 may be provided as, for example, a photo coupler, or the like.

Figure 13:
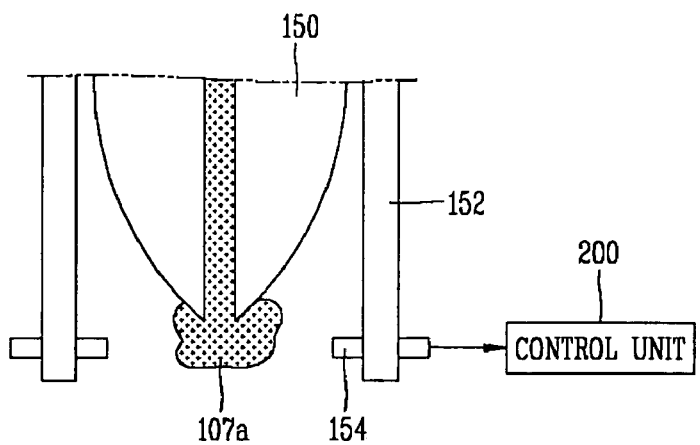
FIG. 13 illustrates a view of residual liquid crystal material on the surface of a nozzle.

As shown in FIG. 13, the second sensor 154 may be connected to a control unit 200. As discussed in greater detail with respect to FIG. 14, the control unit may be used to control or substantially eliminate the accumulation of residual liquid crystal on the surface of the nozzle 150.

Figure 14:
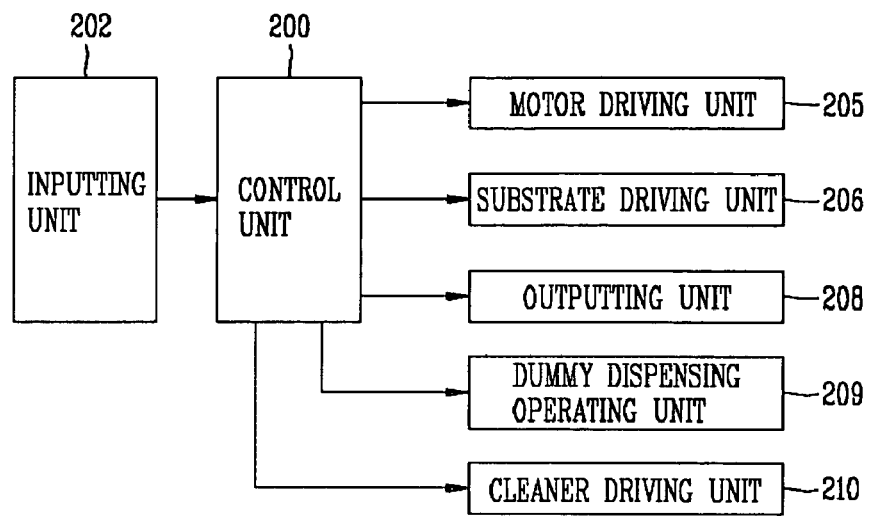
FIG. 14 illustrates a view of a control system according to principles of the present invention.

Referring to FIG. 14, signals generated by the second sensor 154 may be inputted to the control unit 200 via an inputting unit 202. Next, the control unit 200 determines whether a signal generated by the second sensor 154 indicates that a predetermined amount of liquid crystal material has accumulated on the surface of the nozzle 150. In one aspect of the present invention, the control unit 200 may output a control signal to a motor driving unit 205 that operates the first and second motors 131 and 133 which, in turn, control the whether or not liquid crystal material is discharged from the liquid crystal discharge pump 140 and the amount of liquid crystal material discharged from the liquid crystal discharge pump 140. In another aspect of the present invention, the control unit 200 may operate a alignment driving unit 206 that, in turn, moves the substrate to align the nozzle 150 with predetermined dispensing positions on the substrate and/or moves the liquid crystal dispensing apparatus 120 to align the nozzle 150 with predetermined dispensing positions on the substrate.

If the control unit 200 determines that the signal generated by the second sensor 154 indicates a predetermined amount of liquid crystal material has accumulated on the surface of the nozzle 150, the control unit 200 may output a control signal to the motor driving unit 205, causing the motor driving unit 205 to stops driving the first motor 131, thereby stopping the liquid crystal dispensing operation of the liquid crystal discharge pump 140. In one aspect of the present invention, the control unit 200 may cause an outputting unit 208 to convey to a user that residual liquid crystal material has accumulated on the surface of the nozzle 150. In response to the conveyance by the outputting unit 208, the user may remove the accumulated liquid crystal material from the surface of the nozzle 150 by, for example, separating the nozzle 150 from the liquid crystal dispensing apparatus. In another aspect of the present invention, however, the accumulated liquid crystal material may be automatically removed by outputting a signal from the control unit 200 to a dummy dispensing operating unit 209 and a cleaner driving unit 210.

According to principles of the present invention, the control unit 200 may output a signal to the dummy dispensing operating unit 209, causing the dummy dispensing unit 209 to perform a dummy dispensing operation that removes the residual liquid crystal material accumulated on the surface of the nozzle 150. In one aspect of the present invention, the dummy dispensing operation may, for example, include dispensing liquid crystal material onto a portion of the substrate on which an LCD panel will not subsequently be formed, into a measuring cup, into a container, or the like. According to principles of the present invention, the measuring cup may be used to measure the amount of residual liquid crystal material accumulated on the surface of the nozzle 150. According to principles of the present invention, the dummy dispensing may be performed by dispensing more than the predetermined amount of liquid crystal material sufficient to remove the residual liquid crystal material accumulated on the surface of the nozzle 150. In one aspect of the present invention, if the measuring cup is used during the dummy dispensing operation, the weight of liquid crystal material dispensed into the measuring cup may be measured to determine whether the amount of liquid crystal material dispensed during the dummy dispensing operation is equal to the predetermined dispensing amount. If it is determined that the amount of liquid crystal material dispensed during the dummy dispensing operation not equal to the predetermined dispensing amount, the liquid crystal material may continue to be dispensed or the dummy dispensing operation may be terminated.

After the dummy dispensing operation is complete, the residual liquid crystal material accumulated on the surface of the nozzle 150 is substantially removed. Subsequently, the motor driving unit 205 and the substrate (or liquid crystal dispensing apparatus) driving unit 206 may be driven to proceed in dispensing liquid crystal material onto portions of the substrate that will eventually be comprised within LCD panels.

According to principles of the present invention, the control unit 200 may output a signal to the cleaner driving unit 210, causing a cleaner to clean the surface of the nozzle 150 and completely remove residual liquid crystal material accumulated on the surface of the nozzle 150.

According to principles of the present invention, the dummy dispensing operating unit 209 and the cleaner driving unit 210 may be operated in conjunction with each other, or separately and independently. For example, the dummy dispensing operating unit 209 may be driven at short intervals to remove residual liquid crystal material accumulated on the surface of the nozzle 150, while the cleaner driving unit may be driven at long intervals (e.g., after the dummy dispensing operating unit 209 has been driven a predetermined number of times) to remove residual liquid crystal material accumulated on the surface of the nozzle 150. In another aspect of the present invention, however, either the dummy dispensing operating unit 209 or the cleaner driving unit 210, alone, may be used to remove residual liquid crystal material accumulated on the surface of the nozzle 150.

Figure 15:
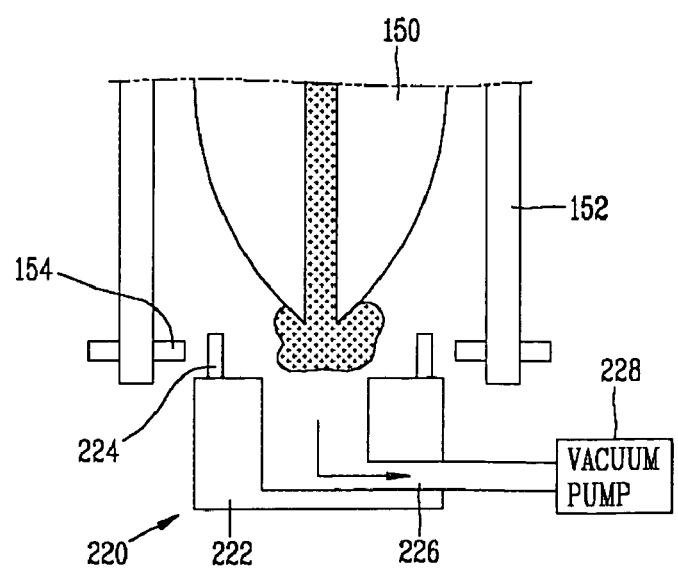
FIG. 15 illustrates a view of a cleaner according to principles of the present invention.

Referring to FIG. 15, the cleaner driving unit 210 may drive a nozzle cleaner 220. In one aspect of the present invention, the nozzle cleaner 220 may, for example, include a body 222, a suction pipe 226 formed at the body 222, and a vacuum pump 228 connected to the suction pipe 226. According to principles of the present invention, the residual liquid crystal 107a accumulated on the surface of the nozzle 150 is usually distributed about a discharge opening of the nozzle 150. Accordingly, the nozzle cleaner 220 may be efficiently driven to clean the nozzle 150 by substantially aligning the suction pipe 226 with a discharge opening of the nozzle 150.

According to principles of the present invention, the nozzle 150 may periodically cleaned. For example, the nozzle 150 may be cleaned after a predetermined number of droplets of liquid crystal material have been dispensed. Upon cleaning, a motor (not shown) may be used to substantially align the suction pipe 226 with the discharge opening of the nozzle 150. Upon aligning the suction pipe 226, a predetermined space is defined by the nozzle 150, the supporting unit 224, and the body 222, wherein the residual liquid crystal material 107a is enclosed within the predetermined space. After the suction pipe 226 is aligned with the discharge opening of the nozzle 150, a vacuum pump 228 may be operated to create a vacuum within the predetermined space. As the result, the residual liquid crystal material 107a accumulated on the surface of the nozzle 150, as well as about the discharge opening, may be sucked into the suction pipe 226, thereby removing the residual liquid crystal material 107a accumulated on the surface of the nozzle 150.

In one aspect of the present invention, the nozzle cleaner 220 may, for example, include a tank for containing the residual liquid crystal material 107a removed from the nozzle 150. In another aspect of the present invention, the tank may be provided between the body 222 and the vacuum pump 228. In still another aspect of the present invention, the sucked residual liquid crystal material may be received into the tank via gravity and not reach the vacuum pump 228. In yet another aspect of the present invention, the tank may be separated from the nozzle cleaner 220 to, for example, facilitate disposal of the received residual liquid crystal material.

Figure 16:
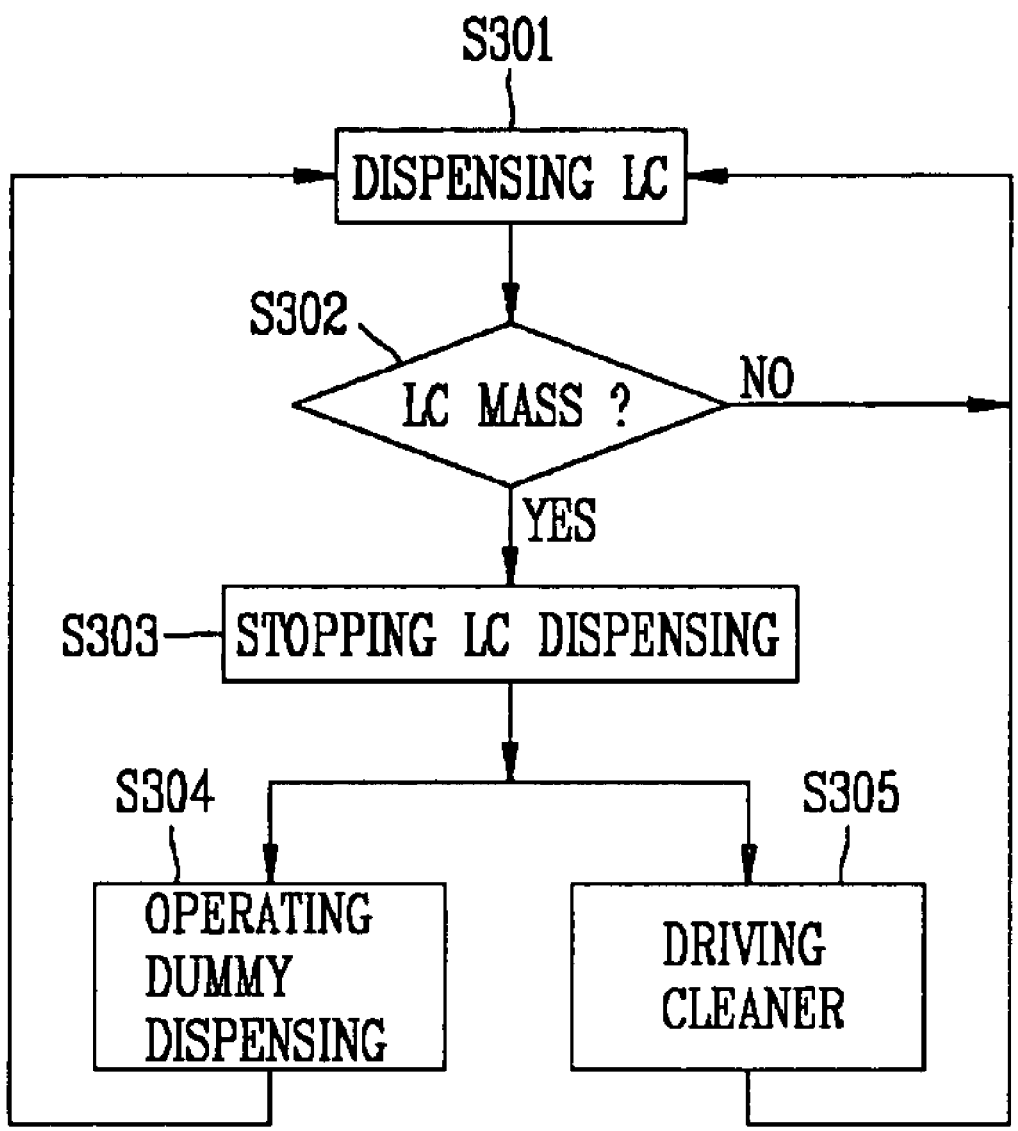
FIG. 16 illustrates a flow chart of a liquid crystal dispensing method according to principles of the present invention.

As discussed above, the second sensor 154 may detect the presence of residual liquid crystal material 107a accumulated on the surface of the nozzle 150. To remove the residual liquid crystal material 107a, dummy dispensing and/or cleaning operations may be performed. FIG. 16 illustrates a flow chart of an exemplary operation of the liquid crystal dispensing apparatus discussed above.

Referring to FIG. 16, as a liquid crystal dispensing starts, the second sensor 154 begins detecting for the presence of residual liquid crystal material accumulated on the surface of the nozzle 150 (see step S301). Based on the detecting, the second sensor 154 outputs a signal to the control unit 200.

If, at step S302, the control unit 200 determines that the signal output by the second sensor 154 indicates no residual liquid crystal material has accumulated on the surface of the nozzle 150 (or that less than a predetermined amount of residual liquid crystal material has accumulated on the surface of the nozzle 150) the liquid crystal dispensing apparatus continues to dispense liquid crystal material onto a substrate. However, if, at step S302, the control unit 200 determines that the signal output by the second sensor 154 indicates that residual liquid crystal material has accumulated on the surface of the nozzle 150 (or that the amount of residual liquid crystal material accumulated on the surface of the nozzle 150 is greater than or equal to a predetermined amount) the liquid crystal dispensing apparatus stops dispensing liquid crystal material onto the substrate. In one aspect of the present invention, the control unit 200 may output a control signal to the motor driving unit 205, thereby stopping an operation of the first motor 131 and stopping the liquid crystal dispensing operation (S303).

Next, the control unit 200 may output a control signal to drive the motor driving unit 205 and the alignment driving unit 206, causing liquid crystal to be dispensed onto a portion of the substrate on which an LCD panel is not to be formed, into a measuring cup, or into a container, and thereby removing liquid crystal that masses on the surface of the nozzle 150 in a dummy dispensing operation (S304). Alternatively, the control unit 200 may output a control signal to the cleaner driving unit 210 and drive the cleaner 220 to remove residual liquid crystal material accumulated on the surface of the nozzle 150 (S305). Alternatively, the residual liquid crystal material may be removed by performing the dummy dispensing operation followed by the cleaning operation.

According to principles of the present invention, the cleaning operation may be used to remove residual liquid crystal material at substantially any time. For example, the nozzle may be cleaned before and/or after the substrate is operably proximate to the liquid crystal dispensing apparatus. In another aspect of the present invention, the cleaning process may be performed between consecutive dispensing operations performed on two substrates.

As discussed above, residual liquid crystal material accumulated on the surface of the nozzle may be effectively removed. Moreover, the principles of the present invention may be applied to any type of liquid crystal dispensing apparatus having a nozzle for dispensing liquid crystal material. Further, the second sensor 154 may be provided in substantially any suitable configuration, regardless of the structure of the nozzle 150, to detect the presence of residual liquid crystal material accumulated on the surface of the nozzle 150.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal dispensing apparatus, comprising:
a container that contains liquid crystal material;
a discharge pump that draws in the liquid crystal material from the container and discharges the drawn liquid crystal material;
a nozzle that dispenses the discharged liquid crystal material; and
a detecting means that detects the presence of liquid crystal material accumulated on the surface of the nozzle.

2. The apparatus of claim 1, wherein the nozzle dispenses the discharged liquid crystal material onto a substrate.

3. The apparatus of claim 1, wherein the detecting means is operably proximate to the nozzle.

4. The apparatus of claim 1, wherein the discharge pump includes:
a cylinder having a suction opening and a discharge opening; and
a piston that draws in the liquid crystal material through the suction opening and discharges the liquid crystal material through the discharge opening.

5. The apparatus of claim 4, wherein:
the piston is arranged within the cylinder; and
a groove is arranged at a center region of a lower portion of the piston.

6. The apparatus of claim 4, wherein the piston is rotatable and axially translatable within the cylinder.

7. The apparatus of claim 4, further including a fixing unit that controls an operation of the discharge pump.

8. The apparatus of claim 7, wherein the fixing unit includes a rotating member coupled to the piston.

9. The apparatus of claim 8, wherein:
the rotating member includes a hole; and
the piston includes a bar inserted within the hole included within the rotating member.

10. The apparatus of claim 9, wherein the bar is rotatably inserted within the hole.

11. The apparatus of claim 1, further comprising a liquid crystal capacity amount controlling member coupled to the discharge pump that controls the amount of liquid crystal material discharged by the discharge pump.

12. The apparatus of claim 11, wherein the liquid crystal capacity amount controlling member controls a fixation angle of the piston.

13. The apparatus of claim 11, further comprising:
a motor that drives the liquid crystal capacity amount controlling member; and a rotational shaft rotatably coupled to the motor and moveably coupled to the liquid crystal capacity amount controlling member.

14. The apparatus of claim 1, wherein the detecting means includes a photo-coupler.

15. The apparatus of claim 1, further comprising a filter that filters liquid crystal before it is dispensed from the nozzle.

16. The apparatus of claim 15, wherein the filter filters liquid crystal after it is discharged from the discharge pump.

17. The apparatus of claim 16, wherein the filter is provided at a front end of the nozzle.

18. The apparatus of claim 16, wherein the filter is provided at a discharge opening of the discharge pump.

19. The apparatus of claim 15, wherein the filter filters liquid crystal before it is drawn into the discharge pump.

20. The apparatus of claim 1, further comprising:
a motor driving unit that drives a motor to operate the discharge pump;
an alignment driving unit that drives at least one of a substrate and the nozzle to align the nozzle to predetermined a dispensing position on the substrate;
a control unit coupled to the detecting means, wherein the control unit stops a normal dispensing operation of liquid crystal material on the substrate when the detecting means detects the presence of liquid crystal material accumulated on the surface of the nozzle; and
a dummy dispensing operating unit coupled to the control unit, wherein the dummy dispensing unit dispenses liquid crystal material at a dummy location after the normal dispensing operation is stopped.

21. The apparatus of claim 20, wherein the dummy location includes a region of the substrate where a liquid crystal display panel is to be not formed.

22. The apparatus of claim 20, wherein the dummy location includes a measuring cup that measures the amount of liquid crystal material dispensed.

23. The apparatus of claim 1, further including a cleaner that removes liquid crystal material accumulated on the surface of the nozzle.

24. The apparatus of claim 23, wherein the cleaner includes:
a body;
a suction pipe arranged within the body; and
a vacuum pump in fluid communication with the suction pipe,
wherein the suction pipe transmits a suction force generated by the vacuum pump to remove liquid crystal material accumulated on the surface of the nozzle.

25. The apparatus of claim 24, wherein the cleaner further includes a tank connected to the suction pipe that receives the removed liquid crystal material.

26. The apparatus of claim 23, further comprising:
a motor driving unit that drives a motor to operate the discharge pump;
an alignment driving unit that drives at least one of a substrate and the nozzle to align the nozzle to predetermined a dispensing position on the substrate;
a control unit coupled to the detecting means, wherein the control unit stops a dispensing operation of liquid crystal material on the substrate when the detecting means detects the presence of liquid crystal material accumulated on the surface of the nozzle; and
a cleaner driving unit coupled to the control unit, wherein the cleaner driving unit drives the cleaner after the normal dispensing operation is stopped.

27. The apparatus of claim 1, wherein the nozzle includes fluorine resin.

28. The apparatus of claim 19, wherein the filter is integrally formed with the nozzle.

29. A method of dispensing liquid crystal material, comprising:
determining whether liquid crystal material is accumulated on the surface of a nozzle of a liquid crystal dispensing apparatus when liquid crystal material is dispensed onto a substrate during a normal dispensing operation;
stopping the normal dispensing operation when it is determined that liquid crystal material has accumulated on the surface of the nozzle;
removing the accumulated liquid crystal material from the surface of the nozzle; and
after removing the accumulated liquid crystal material from the surface of the nozzle, resuming the normal dispensing operation.

30. The method of claim 29, wherein the normal dispensing operation includes:
drawing liquid crystal material from a container into a discharge pump;
discharging the drawn liquid crystal material from the discharge pump to the nozzle; and
dispensing the discharged liquid crystal material onto the substrate through the nozzle.

31. The method of claim 29, wherein removing the accumulated liquid crystal material includes performing a dummy dispensing operation.

32. The method of claim 31, wherein the dummy dispensing operation includes:
aligning the nozzle to a location of the substrate where a liquid crystal display panel is not to be formed; and
dispensing liquid crystal material.

33. The method of claim 31, wherein the dummy dispensing operation includes:
aligning the nozzle with a measuring cup; and
dispensing liquid crystal material into the measuring cup, wherein the measuring cup measures the amount of liquid crystal material dispensed.

34. The method of claim 31, wherein the dummy dispensing operation includes:
aligning the nozzle with a dummy container; and
dispensing liquid crystal material into the dummy container.

35. The method of claim 29, wherein removing the accumulated liquid crystal material includes cleaning the nozzle with a cleaner.

36. The method of claim 35, wherein the cleaning includes:
at least partially enclosing the accumulated liquid crystal material within a predetermined space;
transmitting a predetermined suction force to the predetermined space; and
removing the accumulated liquid crystal material from the surface of the nozzle.

37. The method of claim 31, further including cleaning the nozzle with a cleaner.

38. The method of claim 37, wherein the cleaning includes:
at least partially enclosing the accumulated liquid crystal material within a predetermined space;
transmitting a predetermined suction force to the predetermined space; and
removing the accumulated liquid crystal material from the surface of the nozzle.

39. A liquid crystal dispensing apparatus, comprising:
a container for containing liquid crystal material;
a discharge pump for drawing in the liquid crystal material from the container and for discharging the drawn liquid crystal material;
a nozzle for dispensing, onto a substrate, liquid crystal material discharged by the discharge pump; and
a filter for filtering the liquid crystal material before it is dispensed.

40. The apparatus of claim 39, wherein the discharge pump includes:
a cylinder having a suction opening and a discharge opening; and
a piston for drawing in and discharging the liquid crystal material.

41. The apparatus of claim 39, further comprising a liquid crystal capacity amount controlling member contacting the discharge pump for controlling the amount of liquid crystal material discharged by the discharge pump.

42. The apparatus of claim 39, further comprising:
a first connecting tube for connecting the container and the discharge pump; and
a hollow pin at the end of the first connecting tube, the hollow pin selectively placing the first connecting tube and the container in fluid communication.

43. The apparatus of claim 39, wherein the filter is provided at a front end of the nozzle.

44. The apparatus of claim 39, wherein the filter is provided at a discharge opening of the discharge pump.

45. The apparatus of claim 39, wherein the filter is provided between the container and the discharge pump.

46. A method of dispensing liquid crystal material on a substrate, comprising:
arranging the substrate operably proximate to a liquid crystal dispensing apparatus;
aligning the substrate and a nozzle of the liquid crystal dispensing apparatus;
dispensing liquid crystal material through the nozzle of the liquid crystal dispensing apparatus onto the substrate; and
removing liquid crystal material accumulated on the surface of the nozzle.

47. The method of claim 46, further including arranging the substrate outside the operable proximity of the liquid crystal dispensing apparatus.

48. The method of claim 46, wherein removing accumulated liquid crystal material includes cleaning the surface of the nozzle.

49. The method of claim 48, wherein the cleaning includes:
at least partially enclosing the accumulated liquid crystal material within a predetermined space;
transmitting a predetermined suction force to the predetermined space; and
removing the accumulated liquid crystal material from the surface of the nozzle.

50. The method of claim 46, wherein removing accumulated liquid crystal material includes performing a dummy dispensing operation.

51. The method of claim 50, wherein performing the dummy dispensing operation includes:
aligning the nozzle to a location of the substrate where a liquid crystal display panel is not to be formed; and
dispensing liquid crystal material.

52. The method of claim 50, wherein performing the dummy dispensing operation includes:

aligning the nozzle with a measuring cup; and
dispensing liquid crystal material into the measuring cup, wherein the measuring cup measures the amount of liquid crystal material dispensed.

53. The method of claim 50, wherein performing the dummy dispensing operation includes:
aligning the nozzle with a dummy container; and
dispensing liquid crystal material into the dummy container.

54. The method of claim 48, further including performing a dummy dispensing operation.

55. The method of claim 46, wherein the removing is performed before arranging the substrate operably proximate to the liquid crystal dispensing apparatus.

56. The method of claim 46, wherein the removing is performed after arranging the substrate operably proximate to the liquid crystal dispensing apparatus.

57. The method of claim 46, further comprising replacing the nozzle after a predetermined amount of liquid crystal material is dispensed.

58. The method of claim 46, wherein aligning the substrate and the nozzle includes moving the substrate with respect to the nozzle.

59. The method of claim 58, wherein the moving includes moving the substrate toward the nozzle.

60. The method of claim 46, wherein aligning the substrate and the nozzle includes moving the nozzle with respect to the substrate.

61. The method of claim 60, wherein the moving includes moving the nozzle toward the substrate.

62. The method of claim 46, further including filtering the liquid crystal material before it is dispensed onto the substrate.

63. The method of claim 62, further including filtering the liquid crystal material as it enters the nozzle.

64. The method of claim 62, further including filtering the liquid crystal material before it enters the nozzle.

65. A method of dispensing liquid crystal material on a substrate using a liquid crystal dispensing device having a nozzle, the method comprising:
removing liquid crystal material accumulated on the surface of the nozzle;
arranging a first substrate operably proximate to the liquid crystal dispensing apparatus;
aligning the substrate and the nozzle;
dispensing liquid crystal material onto the first substrate via the nozzle;
removing the first substrate from operable proximity of the liquid crystal dispensing apparatus; and
arranging a second substrate operably proximate to the liquid crystal dispensing apparatus.

66. The method of claim 65, wherein removing liquid crystal material accumulated on the surface of the nozzle includes cleaning the nozzle.

67. The method of claim 66, further including cleaning the nozzle before arranging the second substrate operably proximate to the liquid crystal dispensing apparatus.

68. The method of claim 65, removing liquid crystal material accumulated on the surface of the nozzle includes performing a dummy dispensing operation.

69. The method of claim 68, the dummy dispensing operation includes:
aligning the nozzle to a location of the substrate where a liquid crystal display panel is not to be formed; and
dispensing liquid crystal material.

70. The method of claim 68, the dummy dispensing operation includes:

aligning the nozzle with a measuring cup; and dispensing liquid crystal material into the measuring cup, wherein the measuring cup measures the amount of liquid crystal material dispensed.

71. The method of claim 68, the dummy dispensing operation includes:

aligning the nozzle with a dummy container; and dispensing liquid crystal material into the dummy container.

72. The method of claim 65, further including replacing the nozzle after a predetermined amount of liquid crystal material is dispensed.

73. The method of claim 65, wherein aligning the substrate and the nozzle includes moving the substrate with respect to the nozzle.

74. The method of claim 73, wherein the moving includes moving the substrate toward the nozzle.

75. The method of claim 65, wherein aligning the substrate and the nozzle includes moving the nozzle with respect to the substrate.

76. The method of claim 75, wherein the moving includes moving the nozzle toward the substrate.

* * * * *